United States Patent
Xie et al.

(10) Patent No.: US 8,670,411 B2
(45) Date of Patent: Mar. 11, 2014

(54) METHOD FOR REALIZING SINGLE RADIO VOICE CALL CONTINUITY AND SINGLE RADIO VOICE CALL CONTINUITY SYSTEM

(75) Inventors: Zhenhua Xie, Shenzhen (CN); Zhenwu Hao, Shenzhen (CN); Quanjun Tao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 107 days.

(21) Appl. No.: 13/258,360

(22) PCT Filed: Apr. 14, 2010

(86) PCT No.: PCT/CN2010/071771
§ 371 (c)(1),
(2), (4) Date: Nov. 2, 2011

(87) PCT Pub. No.: WO2010/133112
PCT Pub. Date: Nov. 25, 2010

(65) Prior Publication Data
US 2012/0057569 A1      Mar. 8, 2012

(30) Foreign Application Priority Data
May 22, 2009   (CN) .......................... 2009 1 0202931

(51) Int. Cl.
H04W 4/00         (2009.01)
(52) U.S. Cl.
USPC ............................ 370/331; 370/332; 370/357
(58) Field of Classification Search
None
See application file for complete search history.

(56) References Cited

U.S. PATENT DOCUMENTS

| 8,339,999 | B2* | 12/2012 | You et al. ...................... 370/260 |
| 2008/0020745 | A1* | 1/2008 | Bae et al. .................. 455/422.1 |
| 2009/0086674 | A1 | 4/2009 | Ejzak |
| 2010/0142488 | A1 | 6/2010 | Zhang |
| 2010/0215018 | A1* | 8/2010 | Ejzak ........................... 370/331 |

FOREIGN PATENT DOCUMENTS

| CN | 101370266 A | 2/2009 |
| CN | 101374343 A | 2/2009 |
| JP | 2008546252 A | 12/2008 |
| JP | 2009296077 A | 12/2009 |
| WO | 2008078583 A1 | 7/2008 |
| WO | 2009024082 A1 | 2/2009 |

OTHER PUBLICATIONS

International Search Report on international application No. PCT/CN2010/071771, mailed on Jul. 22, 2010.
English Translation of the Written Opinion of the International Search Authority in international application No. PCT/CN2010/071771, mailed on Jul. 22, 2010.

* cited by examiner

*Primary Examiner* — David Oveissi
(74) *Attorney, Agent, or Firm* — Oppedahl Patent Law Firm LLC

(57) ABSTRACT

A method for realizing a single radio voice call continuity and a single radio voice call continuity system are disclosed. After a UE-1 establishes an IMS session with a remote leg through a PS network, wherein in the IMS session, signaling is anchored to an ICP and media is anchored to an AGW controlled by the ICP, the method is realized as follows: sending a handover request by a control net element of the PS network to an eMSC to request a handover of the IMS session to a CS network access mode; after receiving the handover request, preparing a media link resource by the eMSC for the UE-1 to communicate with the eMSC and sending a call request to the ICP; and controlling the AGW to correlate a media link established by the call request with a remote leg media link of the IMS session by the ICP. The method can effectively solve the problem existing in the prior art that the duration of interruption is too long, and improve user experience.

13 Claims, 16 Drawing Sheets

- - - - - - - - - CS network signaling
- - - - - - IMS network signaling
— · — CS network media
———— IMS network media

- - - Part of media paths after the occurrence of SC

——— IMS network media before the occurrence of SC

- - - Part of media paths after the occurrence of SC

——— IMS network media before the occurrence of SC

— — — Part of media paths after the occurrence of SC

———— IMS network media before the occurrence of SC

METHOD FOR REALIZING SINGLE RADIO VOICE CALL CONTINUITY AND SINGLE RADIO VOICE CALL CONTINUITY SYSTEM

TECHNICAL FIELD

The present invention relates to the field of communications, and in particular to a method for realizing single radio voice call continuity and a single radio voice call continuity system.

BACKGROUND

IP Multimedia Core Network Subsystem (IMS) is an IP-based network architecture proposed by the $3^{rd}$ Generation Partnership Project (3GPP), which constructs an open and flexible service environment to support multimedia application and provide various multimedia services for users.

In an IMS service system, a control layer is separated from a service layer and provides the service layer with necessary functions such as triggering, routing and charging but not specific services.

In the control layer, a service triggering function and a control function are achieved by a Call Session Control Function (CSCF), which is divided into the following three types: Serving-CSCF (S-CSCF), Proxy-CSCF (P-CSCF), and Interrogating-CSCF (I-CSCF), wherein the S-CSCF plays the major role, and the I-CSCF is optional.

The service layer consisting of a series of Application Servers (ASs) can provide specific services, wherein the AS may be an independent entity or located in an S-CSCF.

The control layer (S-CSCF) controls the triggering of a service according to the subscription information of a user and calls a service of an AS to realize the function of the service. The AS and S-CSCF can both be called Server Equipment (SE).

The end-to-end device used in a session, which is called a User Equipment (UE), takes charge of the interaction with a user. Some UEs can access a network in many ways: for example, via a Packet Switch (PS) domain of a 3GPP, via a PS domain of a non-3GPP, or even via a Circuit Switch (CS) domain.

If a CS network is provided with an enhanced Mobile Switch Center (eMSC) which provides a Session Initial Protocol (SIP) interface to realize an interaction with an IMS network, then the interaction between the IMS network and the CS network can be realized through the eMSC.

For a UE with multiple access modes, if the UE is executing a certain service, such as communication, under a certain access mode that is solely used by the UE at a certain time, then the UE needs to change its access mode after the UE moves to another place, the UE and a network have a capability of providing a certain means to protect the service that is being executed by the UE from being interrupted, such a capability is called single terminal radio voice call continuity, which is called Single Radio Voice Call Continuity (SRVCC) for short.

FIG. 1 is a schematic diagram illustrating an SRVCC, which describes a signaling path and a media path for establishment of a session between a single terminal UE-1 and an IMS terminal UE-2, and a signaling path and a media path between the UE-1 and the UE-2 after an SRVCC occurs. For the sake of a simplified illustration and description, the S-CSCF and the Service Continuity AS (SC AS) are represented as one entity, which communicate with each other using an SIP based on IMS standards.

Before the occurrence of SRVCC, the UE-1 and the UE-2 establishes a session using the signaling paths described below:

A102: the signaling path between the UE-1 and the P-CSCF, which communicate with each other via an SIP of the IMS, the signaling path is an access leg path for the SC AS;

A104: the signaling path between the P-CSCF and the SC AS/S-CSCF, which communicate with each other via the SIP of the IMS, the signaling path is also an access leg path for the SC AS;

R101: the signaling path between the SC AS/S-CSCF and the UE-2, which communicate with each other via the SIP of the IMS, the signaling path is a remote leg path for the SC AS;

the signaling paths and the media paths between the UE-1 and the UE-2 are both changed after an SRVCC occurs, wherein the changes of the signaling paths are described as below:

A112: the signaling path between the UE-1 and the eMSC, which communicate with each other via a signaling protocol of a CS domain, the signaling path is an access leg path for the SC AS;

A114: the signaling path between the eMSC and the SC AS/S-CSCF, which communicate with each other via the SIP of the IMS, and the signaling path is also an access leg path for the SC AS;

R101: the signaling path between the SC AS/S-CSCF and the UE-2, which communicate with each other via the SIP of the IMS, the signaling path is a remote leg path for the SC AS, and the signaling path is unchanged after the occurrence of SRVCC.

FIG. 2 is a diagram illustrating an architecture of an existing SRVCC, in which related parts or net elements of a network participating in realizing an SRVCC and the interfaces or connection relations therebetween are described as below:

description on related net elements:

UE: a user terminal equipment with a capability of SRVCC;

CS network: a network providing conventional CS services for a user;

PS network: a network providing PS services for a user, the control net element of which is a Mobility Management Entity (MME) or a Serving GPRS Support Node (SGSN);

eMSC: the eMSC processes a handover request sent by the control net element of the PS network, executes an inter-domain transfer for a session, and correlates a CS handover operation with the inter-domain transfer operation;

IMS network: a network providing IMS services for a user;

description on related interfaces:

S202: an air interface between the UE and the CS network (CS air interface for short) for realizing an information interaction between the UE and the CS network, such as a standard Um interface;

S204: an air interface between the UE and the control net element of the PS network (PS air interface for short) for realizing an information interaction between the UE and the control net element of the PS network, such as a standard Uu interface;

S206: an interface between the CS network and the eMSC (also called a CS signaling interface), which is changed according to a specific net element connected, for instance, the interface between the eMSC and a base station subsystem is a standard Iu-CS interface, and the interfaces between the eMSC and other mobile switch centers are standard inter-office signaling interfaces, that is, E interface and Nc interface;

S208: a signaling interface between the control net element of the PS network and the eMSC (also called inter-domain handover signaling interface) for supporting an inter-domain handover, this interface is a standard Sv interface;

S210: a signaling interface between the control net element of the PS network and the Internet, such as a standard SGi interface, which is capable of providing an IP data bearer for the information interaction between the UE and the Internet, the IMS network can be counted as a specific Internet as it is based on the Internet;

S212: a signaling path between the eMSC and the IMS network, which may be a standard I2 interface based on the SIP of the IMS between the eMSC and the IMS network or a path constructed by connecting a standard Nc interface between the eMSC and a media gateway and a standard Mg interface between the media gateway and the IMS network; if the path refers to the latter, then the media gateway will interpret a message at the Nc interface into an SIP message of the IMS or vice versa; the Nc interface may be an Nc-SIP interface based on an SIP or an Nc-ISUP interface based on ISDN User Protocol (ISUP). Although the Nc-SIP interface and the I2 interface are both based on the SIP, the SIP only makes regulation on the format of a message but not the content of the message (the content of the message is determined by application), the use of the I2 interface indicates that the eMSC supports IMS-related applications, and the use of the Nc-SIP interface indicates that the eMSC supports conventional CS-related applications.

FIG. 3 is a flow chart of an existing method for realizing an SRVCC, which describes the process that an IMS session between a UE-1 and a UE-2 is established, thereby establishing an IMS media connection path consisting of a media connection between the UE-1 and a control net element of a PS network and a media connection between the control net element of the PS network and the UE-2, and also describes the process that a media connection is established by the UE-1 using a CS domain under the support of the UE-1 and a network while the continuity of the former session is kept after the UE-1 is subjected to an SRVCC. The process comprises the following steps:

step 301: the UE-1 sends a measurement report to the control net element of the PS network serving the UE-1 via an interface S204 between the UE-1 and the control net element of the PS network so as to report the measured cell signal strength information;

step 302: the control net element of the PS network serving the UE-1 (the original control net element of the PS network) determines that the neighboring CS network is more suitable for serving the UE-1 according to the cell signal strength information contained in the measurement report and then determines to carry out a handover operation;

step 303: the original control net element of the PS network (such as an MMS or SGSN) sends, via the interface S208 between the control net element of the PS network and an eMSC, the eMSC a handover request, such as a 'handover request' message, the message contains the number information of the UE-1 and the number information of an SC AS for identifying a radio voice call continuity request which is obtained by the control net element of the PS network via a Home Subscriber Server (HSS);

step 304: the eMSC carries out a standard CS handover flow to prepare a media link resource for a target CS network;

step 305: after completing the CS handover flow, the eMSC sends a handover response message to the control net element of the PS network via the interface S208;

step 306: after receiving the handover response message, the control net element of the PS network sends a handover command message to the UE-1 via the interface S204 to inform the UE-1 of performing handover to a CS domain;

step 307: after receiving the handover command message, the UE-1 changes its access mode to be a CS domain access mode;

so far, a CS media connection path is established between the UE-1 and the eMSC, wherein the path consists of a CS media connection between the UE-1 and the CS network and a CS media connection between the CS network and the eMSC;

the following steps follow the step 303 without sequence relationship with steps 304-307;

step 308: after receiving the handover request message sent by the control net element of the PS network, the eMSC sends a call request to the SC AS;

as sent via the signaling path S212 (also called inter-connection and inter-communication signaling path), the call request may be an 'INVITE' message of an SIP or an Initial Address Message (IAM) of an ISUP; and the number information of the UE-1 and the number information of the SC AS are contained in the call request, wherein the number information of the SC AS serves as called information, and the number information of the UE-1 serves as calling information;

step 309: the SC AS finally receives the SIP 'INVITE' message of the IMS forwarded by a CSCF, determines the message to be a radio voice call continuity request according to the called information, and then searches for the ongoing call related to the current call according to the calling information;

step 310: the SC AS sends an update request of the IMS, such as a 'UPDATE' message or a 'reINVITE' message, to the UE-2 via the CSCF on the signaling path of the related ongoing call;

step 311: after receiving the update request, the UE-2 responds an update approval message of the IMS, such as a '200 OK' message;

step 312: after receiving the update approval message forwarded by the CSCF, the SC AS sends an answer call message, such as a '200 OK' message, to the eMSC via the signaling path S212, the message finally received by the eMSC may be the '200 OK' message of the SIP or the ANM (ANswer Message) of the ISUP;

so far, a new media path is established between the eMSC and the UE-2, the eMSC connects the new media path with the CS media path to enable the the UE-1 to continue communication with the UE-2.

It can be seen from above that as the SC AS located in the home network carries out no media path anchoring, it is required to perform an update operation to the remote leg in steps 310-311 in the case where existing method for realizing an SRVCC is used, however, as the transmission delay of IMS signaling for the update operation is relatively long, it still takes a long time to establish a new media path even after a CS media is established, thus causing a long interruption in the communication.

SUMMARY

The technical problem the present invention aims to solve is to overcome the shortcomings of the prior art to provide a method for realizing an SRVCC and an SRVCC system without performing update operation to a remote leg.

In order to solve the aforementioned technical problem, the present invention provides a method for realizing a single radio voice call continuity, after a user equipment (UE-1) establishes an IP Multimedia Core Network Subsystem (IMS) session with a remote leg via a Packet Switch (PS) network, wherein in the IMS session, signaling is anchored to an IMS Control Point (ICP) and media is anchored to an Access GateWay (AGW) controlled by the ICP, with a remote leg through a Packet Switch (PS) network, the method comprises:

sending a handover request by a control net element of the PS network to an enhanced Mobile Switch Center (eMSC) to request a handover of the IMS session to a Circuit Switch (CS) network access mode;

after receiving the handover request, preparing a media link resource by the eMSC for the UE-1 to communicate with the eMSC and sending a call request to the ICP; and controlling the AGW to correlate a media link established by the call request with a remote leg media link of the IMS session by the ICP.

The method may also be characterized in that:

the call request sent by the eMSC may be a Session Initiation Protocol (SIP) call request message, which contains a transmission address H which is newly allocated by the eMSC to receive media data in the new established media link;

in the step that the ICP correlates the media link established by the call request with the remote leg media link of the IMS session: after receiving the SIP call request message, correlating the transmission address H with an external receiving address F of the remote leg media link by the ICP, and sending, via an SIP answer call, the eMSC a transmission address J for receiving media data sent by the eMSC in the new established media link.

The method may also be characterized in that:

in the step that the ICP correlates the media link established by the call request with the remote leg media link of the IMS session:

after receiving the SIP call request message, sending the AGW a map request containing the transmission address H by the ICP; and correlating the transmission address H with the remote leg media link by the AGW, allocating the transmission address J and sending the transmission address J to the ICP via a map response.

The method may also be characterized in that:

the call request sent by the eMSC may be an initial address message of an ISDN User Protocol (ISUP), which contains a line number L1 of a line resource in the new established media link for the eMSC end to transmit CS media; and in the step that the ICP correlates the media link established by the call request with the remote leg media link of the IMS session: after receiving the initial address message, returning an ANM of the ISUP to the eMSC by the ICP, wherein the ANM contains a line number L2 of a line resource in the new established media link for transmitting CS media between the eMSC end and the remote leg.

The method may also be characterized in that:

in the step that the ICP correlates the media link established by the call request with the remote leg media link of the IMS session:

after receiving the initial address message, sending the AGW a map request containing the line number L1 by the ICP; and after receiving the map request, correlating the line number L1 with the remote leg media link by the AGW, allocating the line number L2, and sending the line number L2 to the ICP via a map response.

In order to solve the aforementioned technical problem, the present invention provides a single radio voice call continuity system, the system comprises: a control net element of a Packet Switch (PS) network, a Circuit Switch (CS) network, an enhanced Mobile Switch Center (eMSC), an IP Multimedia Core Network Subsystem Control Point (ICP) and an Access GateWay (AGW), wherein the control net element of the PS network is configured to send a handover request to the eMSC to request a handover of an IMS session to a CS network access mode, wherein the IMS session is a session which is established by a user equipment (UE-1) with a remote leg via a PS network and in which signaling is anchored to the ICP and media is anchored to the AGW controlled by the ICP;

the eMSC is configured to prepare, after receiving the handover request, a media link resource for the UE-1 to communicate with the eMSC and send a call request to the ICP; and the ICP is configured to control the AGW to correlate a media link established by the call request with a remote leg media link of the IMS session.

The system may also be characterized in that:

the call request sent by the eMSC may be a Session Initiation Protocol (SIP) call request message, which contains a transmission address H which is newly allocated by the eMSC to receive media data in the new established media link; and the ICP may be further configured to correlate the transmission address H with an external receiving address F of the remote leg media link after receiving the SIP call request message, and send, via an SIP answer call, the eMSC a transmission address J for receiving media data sent by the eMSC in the new established media link.

The system may also be characterized in that:

the ICP may be further configured to send the AGW a map request containing the transmission address H after receiving the SIP call request message; and the AGW may be configured to correlate the transmission address H with the remote leg media link, allocate the transmission address J, and send the transmission address J to the ICP via a map response.

The system may also be characterized in that:

the call request sent by the eMSC may be an initial address message of an ISDN User Protocol (ISUP), which contains a line number L1 of a line resource in the new established media link for the eMSC end to transmit CS media; and the ICP may be further configured to return an ANM of the ISUP to the eMSC after receiving the initial address message, wherein the ANM contains a line number L2 of a line resource in the new established media link for transmitting CS media between the eMSC end and the remote leg.

The system may also be characterized in that:

the ICP may be further configured to send the AGW a map request containing the line number L1 after receiving the initial address message; and the AGW may be configured to correlate the line number L1 with the remote leg media link after receiving the map request, allocate the line number L2, and send the line number L2 to the ICP via a map response.

In order to solve the aforementioned technical problem, the present invention provides a controller supporting a single radio voice call continuity system, the controller comprises a receiving module and a correlating module which are connected with each other, wherein the receiving module is configured to receive a call request sent by an eMSC and inform the correlating module of the received call request; and the correlating module is configured to control an AGW to correlate a media link established by the call request with a remote leg media link of an IMS session according to the received call request after a UE-1 establishes the IMS session with a remote leg via a PS network, wherein in the IMS session, signaling is anchored to the controller and media is anchored to the AGW controlled by the controller.

The controller may also be characterized in that:

the call request sent by the eMSC may be a Session Initiation Protocol (SIP) call request message, which contains a transmission address H which is newly allocated by the eMSC to receive media data in the new established media link; and the correlating module may be further configured to correlate the transmission address H with an external receiving address F of the remote leg media link, and send, via an SIP answer call, the eMSC a transmission address J for receiving media data sent by the eMSC in the new established media link.

The controller may also be characterized in that:

the call request sent by the eMSC may be an initial address message of an ISDN User Protocol (ISUP), which contains a line number L1 of a line resource in the new established media link for the eMSC end to transmit CS media; and the correlating module may be further configured to return an ANM of the ISUP to the eMSC, wherein the ANM contains a line number L2 of a line resource in the new established media link for transmitting CS media between the eMSC end and the remote leg.

Compared with the prior art, the enhanced SVRCC architecture and the realization method thereof disclosed in the present invention can effectively shorten the duration of interruption and greatly improve user experience.

DETAILED DESCRIPTION

The core idea of the present invention lies in that an expansion net element is introduced to anchor signaling and media (or an existing net element is added with corresponding functions), a signaling is sent to the expansion net element after an SRVCC occurs, and the expansion net element stops the transmission of the signaling by correlating a session, and updates the local leg of the original session media path while keeping the remote leg unchanged.

The present invention is described below in detail by reference to embodiments in conjunction with accompanying drawings.

Figure 1:
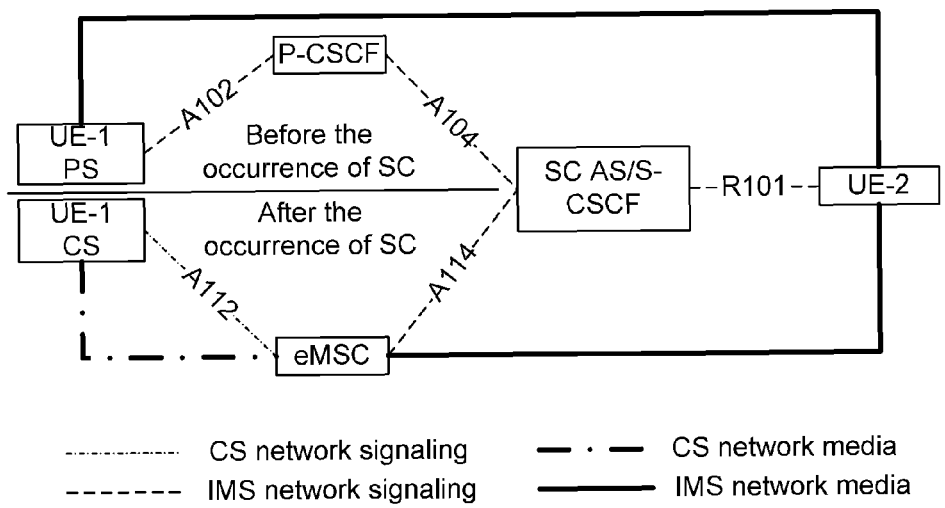
FIG. 1 is a schematic diagram illustrating an SRVCC.
Figure 2:
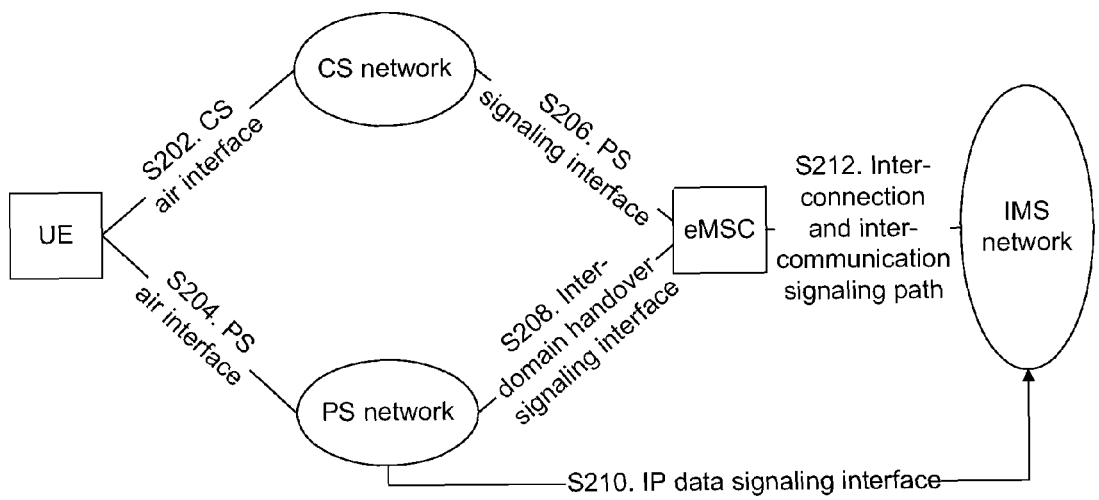
FIG. 2 is a diagram illustrating an architecture of an existing SRVCC.
Figure 4:
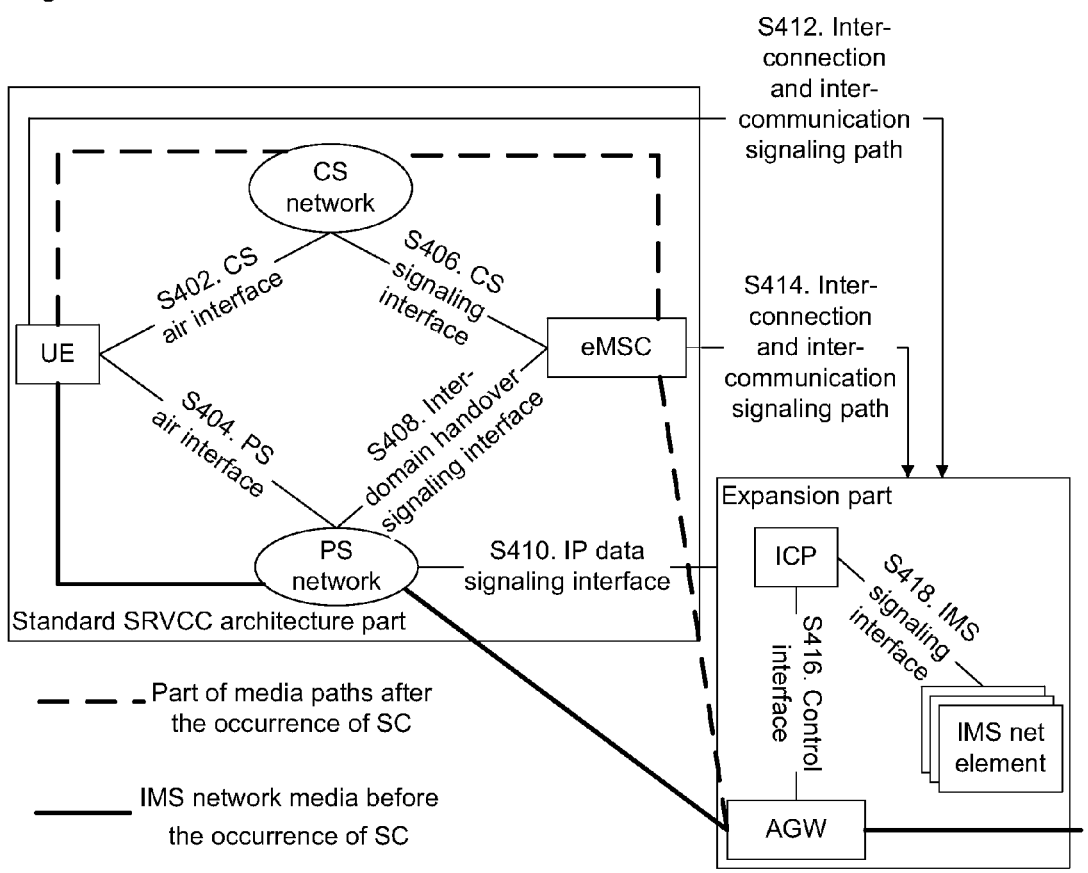
FIG. 4 is a schematic diagram illustrating an architecture of an enhanced SRVCC according to an embodiment of the present invention.

FIG. 4 is a schematic diagram illustrating an architecture of an enhanced SVRCC according to an embodiment of the present invention, related parts or net elements in a network for realizing an enhanced SRVCC and the interfaces or connection relations therebetween are described in this figure, and below is specific description:

description on related net elements:

standard SRVCC architecture part: each net element is the same as the corresponding one described in FIG. 2 except that there is no IMS network;

expansion part includes the following net elements:

an IMS Control Point (ICP) for controlling an Access GateWay (AGW) to allocate resources and map or correlate media paths;

an AGW for processing the forwarding of media data; and

IMS net elements: standard net elements of an IMS network, wherein the ICP and the AGW may be parts of the IMS network or not in different embodiments;

description on related interfaces:

S402-S410: the same interfaces as S202-S210 described in FIG. 2, as the expansion part is based on the Internet, the interface S410 is not connected with a specific net element;

S412: an IMS signaling interface between the UE and the expansion part, which is a logic interface for transmitting IMS signaling interacted between the UE and the expansion part; which net element the interface is connected with depends on specific embodiments, and the interface may not be shown or explained in the case where the ICP and the AGW are parts of the IMS network as the connection is a standard connection;

S414: the same interface as S212 described in FIG. 2;

S416: a signaling interface between the ICP and the AGW, by which the ICP controls the AGW to allocate resources, map and correlate media paths;

S418: a signaling interface between the ICP and an IMS net element for transmitting an IMS protocol message between the UE and a P-CSCF, or an IMS protocol message between the P-CSCF and an I-CSCF/S-CSCF, or an IMS protocol message between a CSCF and an SC AS, depending on the specific location of the ICP.

Figure 3:
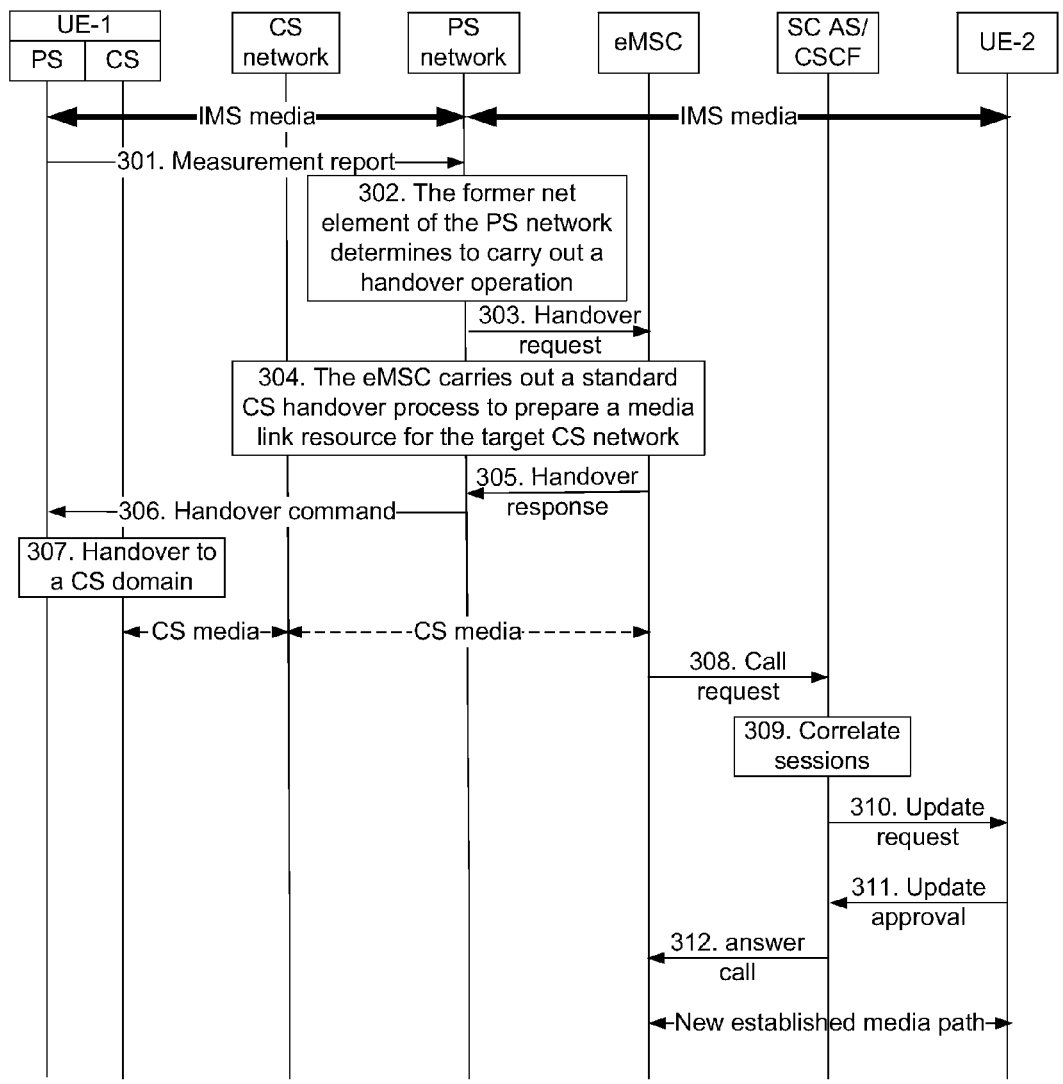
FIG. 3 is a flow chart of an existing method for realizing an SRVCC.
Figure 5:
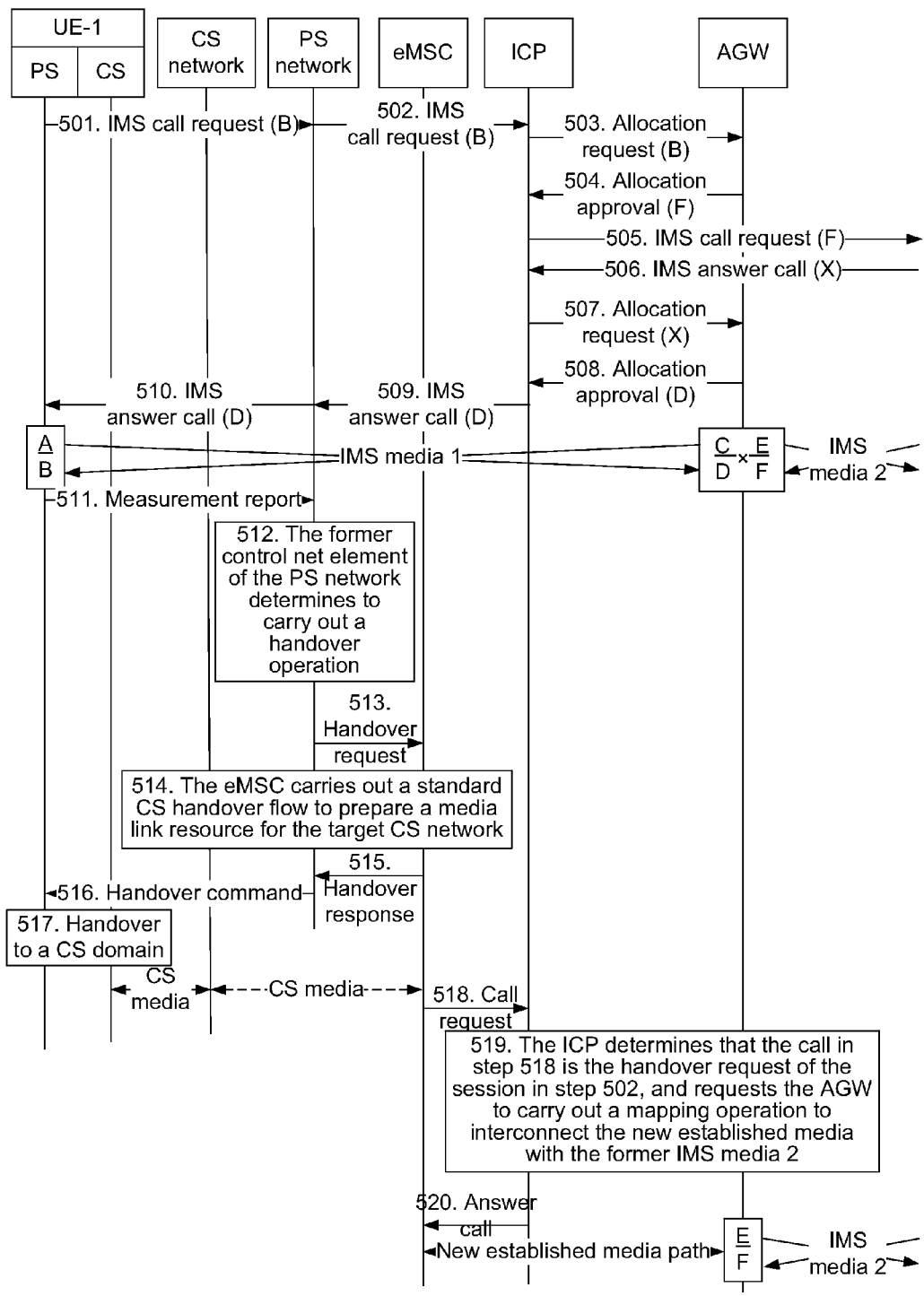
FIG. 5 is a flow chart of an enhanced SRVCC according to an embodiment of the present invention.

FIG. 5 is a flow chart of an enhanced SRVCC according to an embodiment of the present invention, which describes the process of the establishment of an IMS session between a UE-1 and a UE-2, and the consequent establishment of a media connection by the UE-1 using a CS domain under the support of the UE-1 and a network while the continuity of the former session is kept after the UE-1 is subjected to an SRVCC, this process comprises the following steps:

steps 501-502: the UE-1 initiates an IMS call request, for instance, the UE-1 sends an 'INVITE' message, wherein the call request is actually transmitted by the interfaces S404 and S410 and born on an IP bearer established by a control net element of a PS network and therefore passes the control net element of the PS network; the transmission address information of the UE-1 for receiving media data is contained in the call request and represented as B, the call request is routed to the ICP, and the routing may pass some net elements of the IMS network or not, depending on specific embodiments;

step 503: the ICP requests the AGW to allocate an address resource via the interface S416, for instance, the ICP sends an allocation request message in which the transmission address information B is contained;

step 504: the AGW allocates port resources C and F, wherein the port F is used for receiving the media data sent by a remote leg and establishing a correlation between the received media data and the transmission address information B so that all the media data received by the port F need to be forwarded to the transmission address B, and the port C is used for forwarding the media data received by the port F; then the AGW sends, via the interface S416, the ICP an allocation approval message, such as an allocation response message, in which the information of the port F is contained; for the sake of a simplified description, the transmission address information corresponding to the port F, which includes information of an IP address and a port, is still represented as F;

if the call to be established by the UE-1 includes more than one media, then the B includes information of multiple transmission addresses for receiving different media data, in step 503, there may be one message containing information of multiple transmission addresses for receiving different media data or multiple messages each of which contains information of a transmission address for receiving single media data; and correspondingly, in step 504, there may be one message containing information of multiple ports or multiple messages each of which contains information of a port, the specific realization method causes no influence on the essence of the present invention;

step 505: the ICP replaces the transmission address B in the IMS call request described in step 502 with the transmission address F and then forwards the IMS call request to the remote leg;

step 506: after receiving the IMS call request, the remote leg sends an IMS answer call, such as a '200 OK' message, which contains the transmission address information (represented as X) of the remote leg for receiving media data;

step 507: after receiving the IMS answer call, the ICP requests the AGW to allocate an address resource via the interface S416, for instance, the ICP sends an allocation request message containing the transmission address information X;

step 508: the AGW allocates port resources D and E, wherein the port D is used for receiving the media data sent by the UE-1 and establishing a correlation between the received media data and the transmission address X so that all the media data received by the port D need to be forwarded to the transmission address X, and the port E is used for forwarding the media data received by the port D; then the AGW sends, via the interface S416, the ICP an allocation approval message, such as an allocation response message, in which the information of the port D is contained; for the sake of a simplified description, the transmission address information corresponding to the port D is still represented as D;

if the X includes information of multiple transmission addresses for receiving different media data, then in step 507, there may be one message containing information of multiple transmission addresses for receiving different media data or multiple messages each of which contains information of a transmission address for receiving single media data; and correspondingly, in step 508, there may be one message containing information of multiple ports or multiple messages each of which contains information of a port, the specific realization method causes no influence on the essence of the present invention;

steps 509-510: the ICP replaces the transmission address X in the IMS answer call described in step 506 with the transmission address D and then forwards the IMS answer call to the UE-1; the message may pass some IMS net elements or not depending on specific embodiments, and certainly passes the control net element of the PS network as the message is actually born on an IP bearer established by the control net element of the PS network and transmitted to the UE-1;

so far, an IMS media connection is established between the UE-1 and the remote leg which includes an IMS media connection 1 (IMS media 1 for short) between the UE-1 and the AGW and an IMS media connection 2 (IMS media 2 for short) between the AGW and the remote leg;

below is description on steps for an inter-domain handover of the UE-1:

steps 511-517: the same steps as steps 301-307 described in FIG. 3;

step 518: after receiving the handover request message from the control net element of the PS network, the eMSC sends a call request to the ICP; as sent via the signaling path S414, the request may be an 'INVITE' message of the SIP or the IAM of the ISUP; and the call request contains the number information of the UE-1 which serves as calling information and the number information or identification information of the ICP which serves as called information;

step 518 and the following steps follow step 513 without sequence relationship with steps 514-517;

step 519: the ICP determines that the call request described in step 518 is the handover request (the target of the call is the number information or identification information of the ICP, which can be correlated with the session of step 502 via the calling information of the call) of the session described in step 502, and requests the AGW to carry out a mapping operation to interconnect the new established media with the former IMS media 2, the specific realization mode changes with different architectures;

step 520: after the mapping operation is completed, the ICP sends an answer call message to the eMSC via the signaling path S414, and the message finally received by the eMSC may be the '200 OK' message of the SIP or the ANM of the ISUP, depending on specific connections;

so far, a new media path is established between the eMSC and the AGW, the eMSC connects the new established media path with the CS media path, and the AGW connects the new established media path with the IMS media connection 2 so that the UE-1 can continue to communicate with the UE-2.

According to an embodiment of the present invention, a controller (namely, the ICP described in the present invention) supporting an SRVCC system comprises a receiving module and a correlating module which are connected with each other, wherein the receiving module is configured to receive a call request sent by an eMSC and inform the correlating module of the received call request; and the correlating module is configured to control an AGW to correlate a media link established by the call request with a remote leg media link of an IMS session according to the received call request after a UE-1 establishes the IMS session with a remote leg via a PS network, wherein in the IMS session, signaling is anchored to the controller and media is anchored to the AGW controlled by the controller.

When the call request sent by the eMSC is an SIP call request message, the message contains a transmission address H which is newly allocated by the eMSC and used for receiving media data in the new established media link; and the correlating module is further configured to correlate the transmission address H with an external receiving address F of the remote leg media link and send a transmission address J for receiving the media data sent by the eMSC in the new established media link to the eMSC via an SIP answer call.

When the call request sent by the eMSC is an IAM of an Integrated Services Digital Network User Protocol (ISUP), the message contains a line number L1 of a line resource in the new established media link for the eMSC end to transmit CS media; and the correlating module is further configured to return an ANM of the ISUP to the eMSC, wherein the ANM contains a line number L2 of a line resource in the new established media link for transmitting CS media between the eMSC end and a remote leg.

For the sake of a simplified description, the interface information corresponding to the interface S410 is no longer shown or explained in the following embodiments, the complete description of the present invention is not influenced as the interface S410 expresses an IP connection relation, and the IMS network and the expansion part of the present invention are entirely an IP-based service network.

Embodiment of Architecture 1

Figure 6:
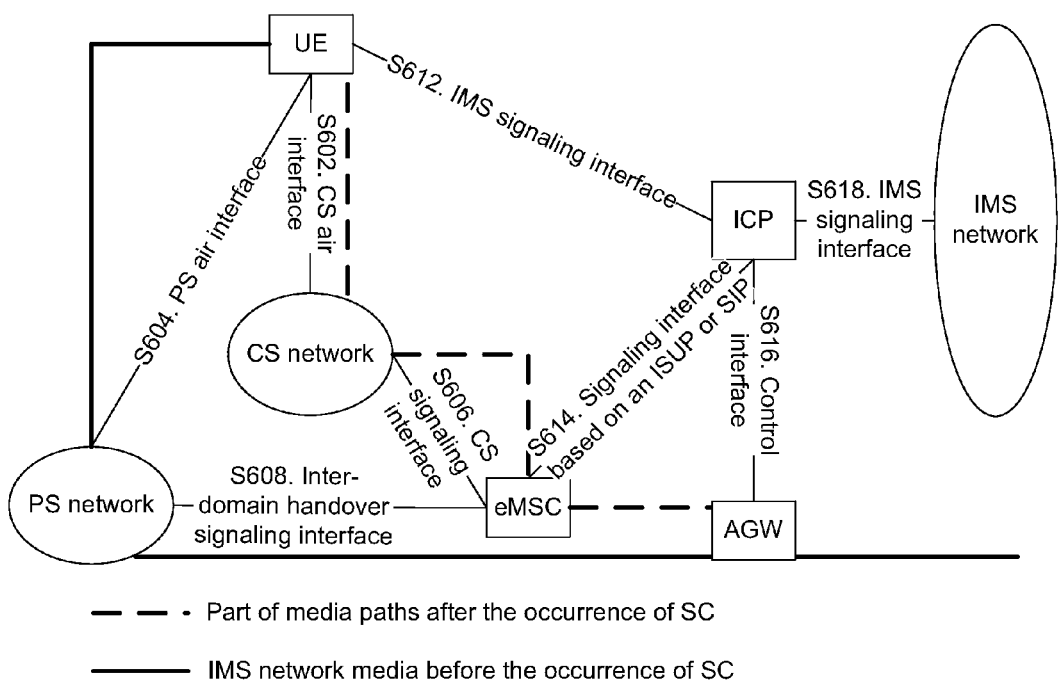
FIG. 6 is a diagram illustrating an architecture 1 of an enhanced SRVCC according to an embodiment of the present invention.

FIG. 6 is a diagram 1 illustrating an architecture 1 of an enhanced SRVCC according to an embodiment of the present invention, which describes related parts or net elements of a network for realizing an enhanced SRVCC and the interfaces or connection relations therebetween, below is specific description:

description on related net elements:

standard SRVCC architecture part: each net element is the same as the corresponding one described in FIG. 4;

ICP: the ICP controls an AGW to allocate resources and map or correlate media paths; and AGW: the AGW realizes the forwarding of IP media data or forwarding between CS media data and IP media data;

description on related interfaces:

S602-S608: the same interfaces as interfaces S402-S408 described in FIG. 4;

S612: an IMS signaling interface between a UE and an ICP for transmitting IMS signaling between the UE and a P-CSCF via the ICP, such as a Gm interface in accordance with IMS standard;

S614: a signaling interface between an eMSC and the ICP for transmitting a message during establishment of the link between the eMSC and the ICP, such as a standard Nc interface, this interface may be an Nc-SIP interface based on the SIP or an Nc-ISUP interface based on the ISUP;

S616: a signaling interface between the ICP and the AGW for enabling the ICP to control the AGW to allocate resources and map or correlate media paths; and S618: a signaling interface between the ICP and an IMS net element for transmitting an IMS protocol message between the UE and the P-CSCF, such as a Gm interface in accordance with IMS standard.

Embodiment of Flow 1

Figure 7:
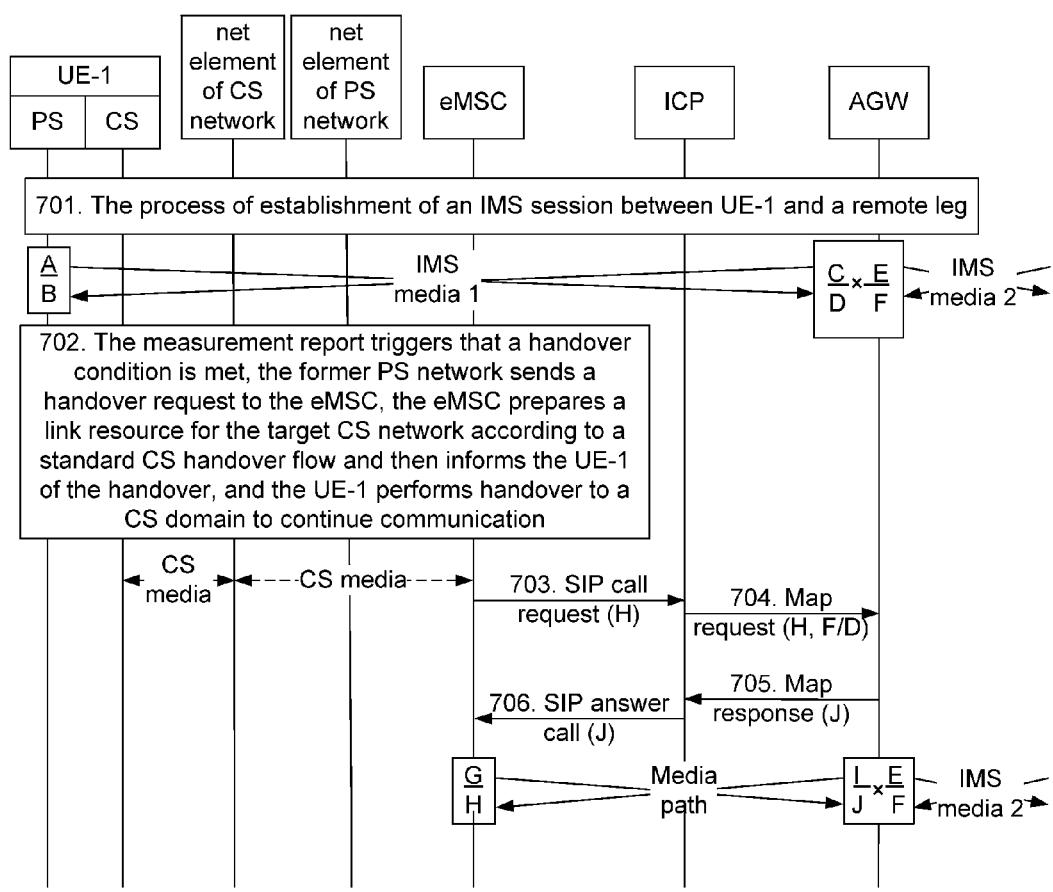
FIG. 7 is a flow chart 1(Nc-SIP) of an enhanced SRVCC based on the architecture 1 according to an embodiment of the present invention.

FIG. 7 is a flow chart 1 (Nc-SIP) of an enhanced SRVCC based on the architecture 1 according to an embodiment of the present invention, which describes the process of the establishment of an IMS session between a UE-1 and a UE-2, and the consequent establishment of a media connection by the UE-1 using a CS domain under the support of the UE-1 and a network while the continuity of the former session is kept after the UE-1 is subjected to the SRVCC, wherein an Nc-ICP interface is used between an eMSC and an ICP. The process comprises the following steps:

step 701: this step is similar to steps 501-510 described in FIG. 5, wherein an IMS message is transmitted between the UE and the ICP without passing any standard IMS net element, an IMS media connection, including an IMS media connection 1 between the UE-1 and the AGW and an IMS media connection 2 between the AGW and the remote leg, is established between the UE-1 and the remote leg;

step 702: this step is the same as steps 511-517 described in FIG. 5;

step 703: after receiving a handover request message sent by the control net element of a PS network, the eMSC sends a call request to the ICP via the signaling path S614; in this embodiment, as the interface S614 refers to an Nc-SIP interface, the sent message is an 'INVITE' message of the SIP, the call request contains the number information of the UE-1 and the number information or identification information of the ICP, wherein the number information or identification information of the ICP serves as called information, the number information of the UE-1 serves as calling information, and additionally, a transmission address H of the eMSC for receiving media data is contained in the message;

step 703 may be executed before step 702 is completed and can be understood in detail by reference to the related description of step 518;

step 704: the ICP determines that the call request described in step 703 is a handover request of the session of step 701, and requests the AGW to carry out a mapping operation, for instance, the ICP sends a 'Map request' message which contains the transmission address H of the eMSC and the transmission address F of the former IMS media connection 2, or the transmission address D of the former IMS media connection 1;

step 705: the AGW carries out a mapping operation to connect a new established media connection with the former IMS media connection 2, and allocates a new local leg media data receiving port J; for the sake of a simplified description, the transmission address information corresponding to the port J is still represented as J, after the mapping operation is completed, the AGW sends a map response message to the ICP via the interface S616, wherein the map response message contains the transmission address J of the AGW for receiving media data;

step 706: after receiving the map response, the ICP sends an answer message of the Nc-SIP, such as a '200 OK' message, to the eMSC via the interface S614, wherein the answer message contains the obtained media resource information of the AGW;

so far, a new media path is established between the eMSC and the AGW, the eMSC connects the new established media path with the CS media path, and the AGW connects the new established media path with the IMS media connection 2 so that the UE-1 can continue to communicate with the UE-2.

Embodiment of Flow 2

Figure 8:
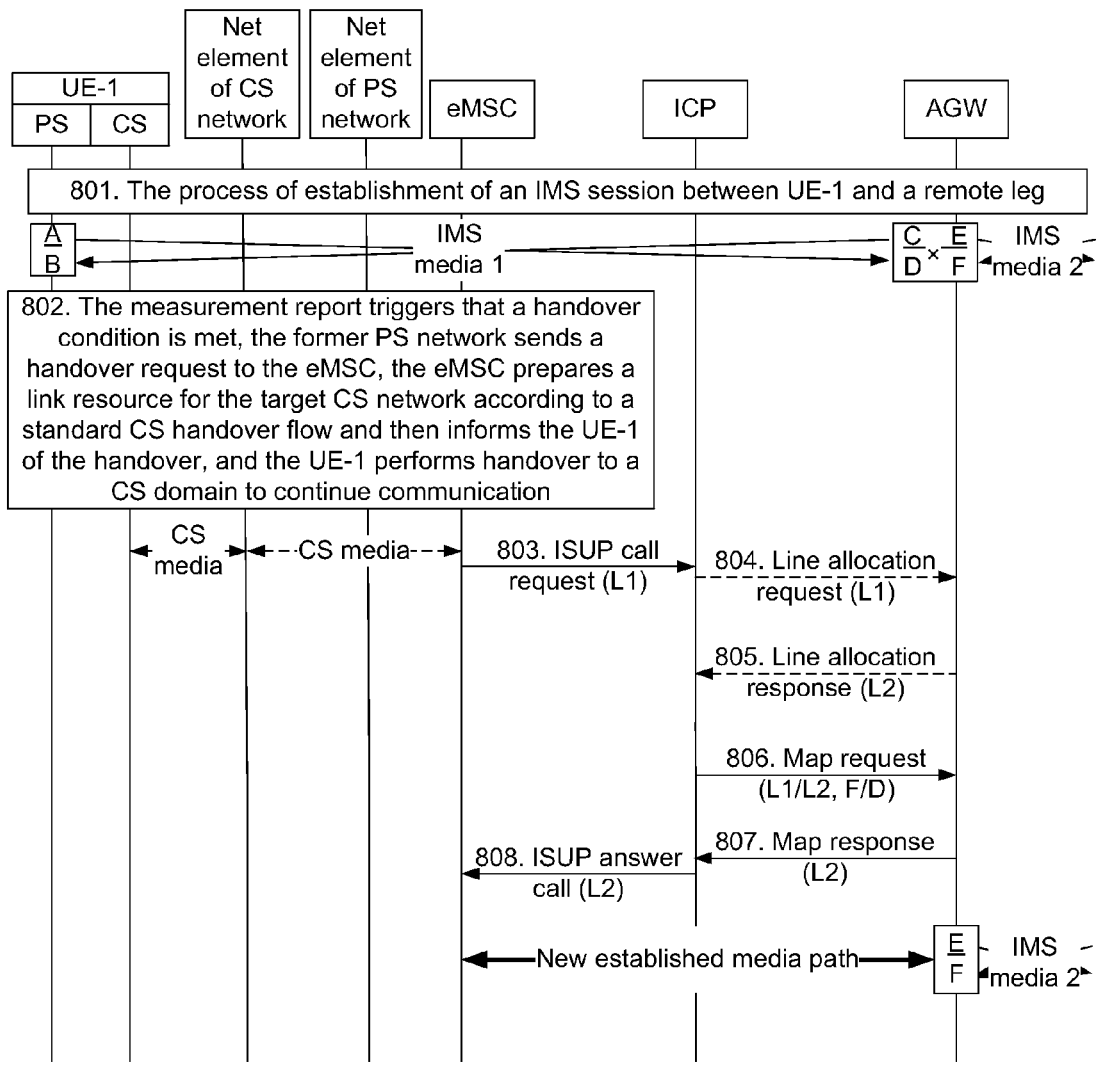
FIG. 8 is a flow chart 2 (Nc-ISUP) of an enhanced SRVCC based on the architecture 1 according to an embodiment of the present invention.

FIG. 8 is a flow chart 2(Nc-ISUP) of an enhanced SRVCC based on the architecture 1 according to an embodiment of the present invention, which describes the process of the establishment of an IMS session between a UE-1 and a UE-2, and the consequent establishment of a media connection by the UE-1 using a CS domain under the support of the UE-1 and a network while the continuity of the former session is kept after the UE-1 is subjected to the SRVCC, wherein an Nc-ISUP interface is used between an eMSC and an ICP. The process comprises the following steps:

steps 801-802: the same steps as steps 701-702 described in FIG. 7;

step 803: after receiving a handover request message sent by the control net element of a PS network, the eMSC sends a call request to the ICP via the signaling path S614; in this embodiment, as the interface S614 refers to an Nc-ISUP interface, the sent message is an 'IAM' of an ISUP, which contains the line number L1 of a line resource for the eMSC to transmit CS media; the call request contains the number information of the UE-1 and the number information of the ICP, wherein the number information of the ICP serves as called information, the number information of the UE-1 serves as calling information;

step 803 may be executed before step 802 is completed and can be understood in detail by reference to the related description of step 518;

step 804: the ICP determines that the call request described in step 803 is a handover request of the session of step 801, and optionally requests the AGW to carry out a line allocation operation, for instance, the ICP sends a 'Line Alloc request' message containing the obtained line number L1, wherein the message is transmitted via the interface S616;

step 805: after receiving the line allocation request, the AGW allocates line resource for transmitting CS media, which corresponds to a line number L2, and then sends a line allocation response, such as a 'Line Alloc response' message, to the ICP via the interface S616, wherein the line allocation response message contains the allocated line number L2;

step 806: the ICP requests the AGW to carry out a mapping operation, for instance, the ICP sends a 'Map request' message, the message contains the obtained line number L1, and may contain the obtained line number L2 if steps 804-805 are executed, and also contains the transmission address F of the former IMS media connection 2 or the transmission address D of the former IMS media connection 1;

step 807: the AGW carries out a mapping operation to connect the new established media connection with the former IMS media connection 2, in the case where steps 804-805 are not executed, the AGW allocates a new line resource for transmitting CS media data as the line number information is carried in the mapping operation, and the corresponding line number is set to be L2; and in the case where steps 804-805 are executed, then the line resource has been allocated, the AGW sends a map response message to the ICP via the interface S616, wherein the map response message may contain no line number information if steps 804-805 are executed, or contain the information of the new allocated line number L2 if steps 804-805 are not executed;

step 808: after receiving the map response, the ICP sends, via the interface S614, the eMSC an answer message of the Nc-ISUP, such as an 'ANM', which contains the obtained line information of the AGW for transmitting CS media data;

so far, a new CS media path is established between the eMSC and the AGW, the eMSC connects the new established media path with the CS media path between the UE and the eMSC, and the AGW connects the new established CS media path with the IMS media connection 2 so that the UE-1 can continue to communicate with the UE-2.

Embodiment of Architecture 2

Figure 9:
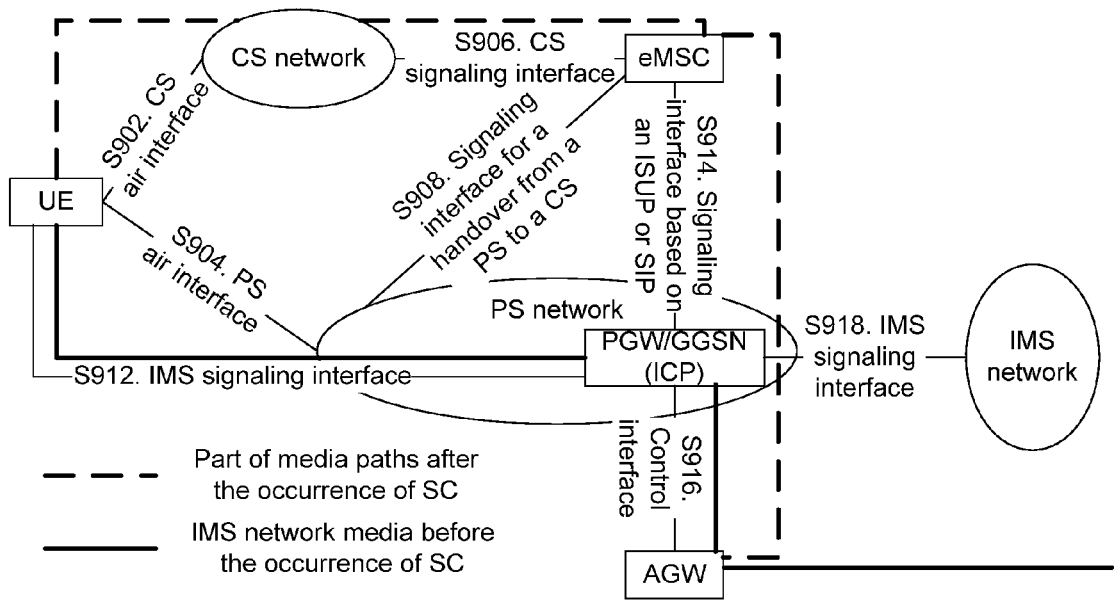
FIG. 9 is a diagram illustrating an architecture in which an ICP and a PGW/GGSN are integrated based on the architecture 1 according to an embodiment of the present invention.

FIG. 9 is a diagram illustrating an architecture in which an ICP and a PGW/GGSN are integrated based on the architecture 1 according to an embodiment of the present invention, which describes related parts or net elements of a network participating in realizing an enhanced SRVCC, and the interfaces or connection relations therebetween, below is specific description:

description on related net elements:

standard SRVCC architecture part: net elements, except for the control net element of the PS network, are the same as the corresponding net elements described in FIG. 4;

PGW/GGSN: a net element for the control net element of the PS network connecting with the Internet, belonging to the control net element of the PS network, the net element is called a Packet Data Network GateWay/Global GPRS Support Node, and is increased with an IMS Control Point function to control an AGW to allocate resources, map or correlate media paths, and processes the interaction between the control net element of the PS network and an IP network;

AGW: an access gateway for realizing the forwarding of IP media data or forwarding between CS media data and IP media data;

description on related interfaces:

S902-S908: the same interfaces as interfaces S402-S408 described in FIG. 4;

S912: an IMS signaling interface between the UE and the PGW or GGSN for transmitting IMS signaling between the UE and the P-CSCF via the PGW/GGSN, such as a Gm interface in accordance with IMS standard;

S914: a signaling interface between an eMSC and the PGW/GGSN for transmitting a message during establishment process of the link between the eMSC and the PGW/GGSN, such as a standard Nc interface based on an SIP (Nc-SIP) or a standard Nc interface based on an ISUP (Nc-ISUP);

S916: a signaling interface between the PGW/GGSN and the AGW for enabling the PGW/GGSN to control the AGW to allocate resources, map or correlate media paths; and S918: a signaling interface between the PGW/GGSN and an IMS net element for transmitting an IMS protocol message between the UE and the P-CSCF via the PGW/GGSN, such as a Gm interface in accordance with IMS standard;

the embodiments of the flow under this architecture are almost identical to those described in FIG. 7 and FIG. 8 except that the ICPs in FIG. 7 and FIG. 8 are replaced with the PGW/GGSN, so no more repeated description is given here.

Embodiment of Architecture 3

Figure 10:
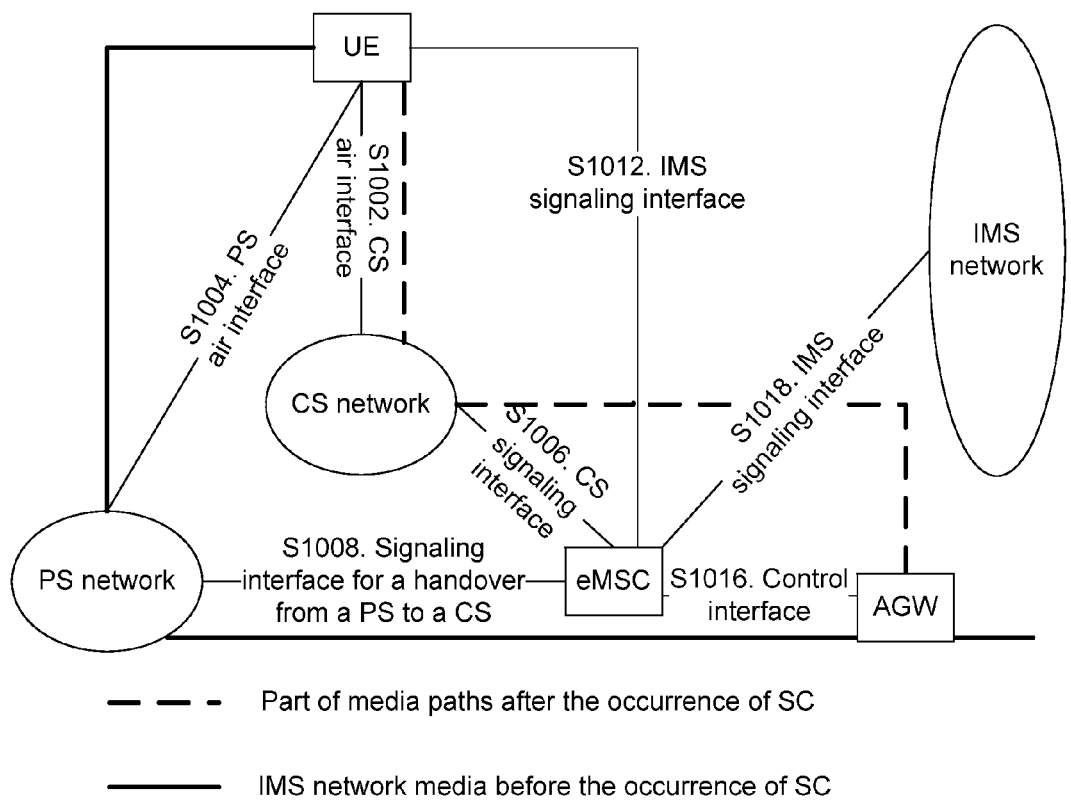
FIG. 10 is a diagram illustrating an architecture in which an ICP and an eMSC are integrated based on the architecture 1 according to an embodiment of the present invention.

FIG. 10 is a diagram illustrating an architecture in which an ICP and an eMSC are integrated based on the architecture 1 according to an embodiment of the present invention, which describes related parts or net elements of a network participating in realizing an enhanced SRVCC, and the interfaces or connection relations therebetween, below is specific description:

description on related net elements:
standard SRVCC architecture part: net elements, except for the eMSC, are the same as the corresponding net elements described in FIG. 4;

eMSC: an enhanced mobile switch center for processing a handover request sent by a control net element of a PS network, carrying out an inter-domain transfer for a session and correlating a CS handover operation with the inter-domain transfer operation, the eMSC is increased with an IMS control point function to control an AGW to allocate resources, map or correlate media paths;

AGW: an access gateway for realizing the forwarding between CS media data and IP media data;

description on related interfaces:
S1002-S1008: the same interfaces as interfaces S402-S408 described in FIG. 4;

S1012: an IMS signaling interface between the UE and the eMSC for transmitting IMS signaling between the UE and the P-CSCF via the eMSC, such as a Gm interface in accordance with IMS standard;

S1016: a signaling interface between the eMSC and the AGW for enabling the eMSC to control the AGW to allocate resources, map or correlate media paths; and S1018: a signaling interface between the eMSC and an IMS net element for transmitting an IMS protocol message between the UE and the P-CSCF via the eMSC, such as a Gm interface in accordance with IMS standard.

Embodiment of Flow 3

Figure 11:
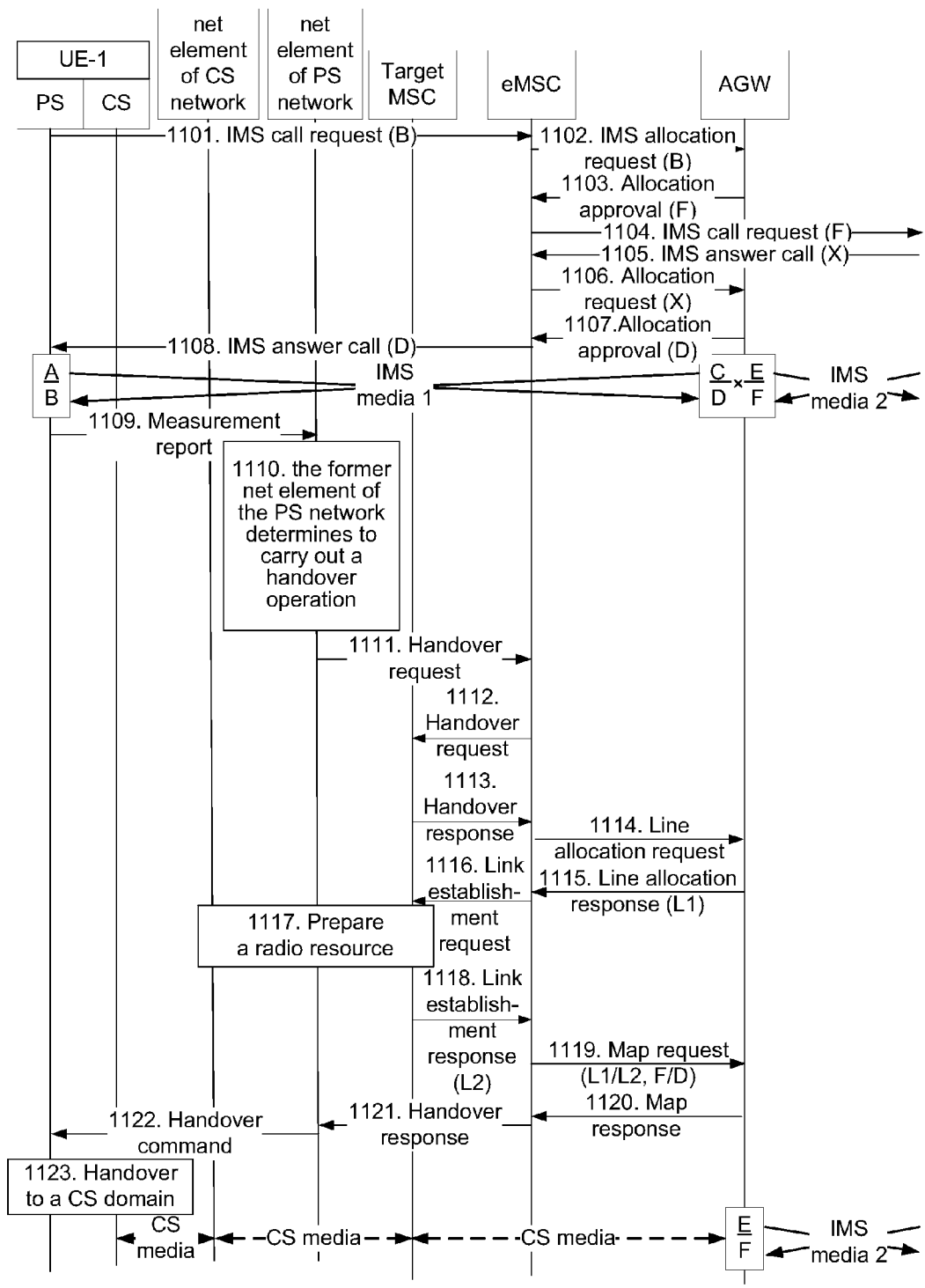
FIG. 11 is a flow chart of an enhanced SRVCC based on FIG. 10 according to an embodiment of the present invention.

FIG. 11 is a flow chart of an enhanced SRVCC based on FIG. 10 according to an embodiment of the present invention, which describes the process of the establishment of an IMS session between a UE-1 and a UE-2, and the consequent establishment of a media connection by the UE-1 using a CS domain under the support of the UE-1 and a network while the continuity of the former session is kept after the UE-1 is subjected to an SRVCC, wherein the target cell to which the UE-1 is handed over is managed by another MSC but not by an eMSC. The process comprises the following steps:

step 1101: the UE-1 initiates an IMS call request, for instance, the UE-1 sends an 'INVITE' message, which is born on an IP bearer established by a control net element of a PS network and contains the transmission address information of the UE-1 for receiving media data, wherein the transmission address information is represented as B; the message is routed to the eMSC, and the routing passes no net element of the IMS network;

step 1102: the eMSC requests the AGW to allocate an address resource via the interface S1016, for instance, the eMSC sends an allocation request message in which the transmission address information B is contained;

step 1103: the AGW allocates port resources C and F, wherein the port F is used for receiving media data sent by a remote leg and establishing a correlation so that all the media data received by the port F need to be forwarded to the transmission address B, and the port C is used for forwarding the media data received by the port F; then the AGW sends, via the interface S1016, the eMSC an allocation approval message, such as an allocation response message containing the information of the port F; for the sake of a simplified description, the transmission address information corresponding to the port F, which includes information of an IP address and a port, is still represented as F;

if the call to be established by the UE-1 includes more than one media, then the B includes information of multiple transmission addresses for receiving different media data, in step 1102, there may be one message containing information of multiple transmission addresses for receiving different media data or multiple messages each of which contains information of a transmission address for receiving single media data; and correspondingly, in step 1103, there may be one message containing information of multiple ports or multiple messages each of which contains information of a port, the specific realization method causes no influence on the essence of the present invention;

step 1104: the eMSC replaces the transmission address B described in step 1101 with the transmission address F and then forwards the IMS call request message;

step 1105: after receiving the IMS call request message, the remote leg sends an IMS answer call message, such as a '200 OK' message, which contains the transmission address information (represented as X) of the remote leg for receiving media data;

step 1106: after receiving the IMS answer call message, the eMSC requests the AGW to allocate an address resource via the interface S1016, for instance, the eMSC sends an allocation request message containing the transmission address information X;

step 1107: the AGW allocates port resources D and E, wherein the port D is used for receiving media data sent by the UE-1 and establishing a correlation so that all the media data received by the port D needs to be forwarded to the transmission address X, and the port E is used for forwarding the media data received by the port D; then the AGW sends, via the interface S1016, the eMSC an allocation approval message, such as an allocation response message containing the information of the port D; for the sake of a simplified description, the transmission address information corresponding to the port D is still represented as D;

if the X includes information of multiple transmission addresses for receiving different media data, then in step 1106, there may be one message containing information of multiple transmission addresses for receiving different media data or multiple messages each of which contains information of a transmission address for receiving single media data; and correspondingly, in step 1107, there may be one message containing information of multiple ports or multiple messages each of which contains information of a port, the specific realization method causes no influence on the essence of the present invention;

step 1108: the eMSC replaces the transmission address X described in step 1105 with the transmission address D and then forwards the IMS answer call message; the message passes no IMS net elements, and is actually born on an IP bearer established by the control net element of the PS network to be transmitted to the UE;

so far, an IMS media connection is established between the UE-1 and the remote leg, and includes an IMS media connection 1 between the UE-1 and the AGW and an IMS media connection 2 between the AGW and the remote leg;

below is description on an inter-domain handover of the UE-1:

steps 1109-1111: the same steps as steps 511-513 described in FIG. 5;

step 1112: the eMSC prepares a media link resource for the target CS network according to a standard CS handover flow, as the target cell belongs to a different MSC from the eMSC, the eMSC sends the target MSC a handover request, such as a 'Handover Request' message;

step 1113: the target MSC returns a handover response message which contains an inter-office handover number;

step 1114: the eMSC requests the AGW to allocate a line resource for transmitting CS media via the interface S1016, for instance, the eMSC sends a 'Line Alloc request';

step 1115: the AGW receives the line resource allocation request, allocates a line resource for transmitting the CS media, and responses the eMSC the allocated line number L1, for instance, the AGW sends a 'Line Alloc response' message which contains the information of the line number L1;

step 1116: the eMSC sends the target MSC a link establishment request, for example, the eMSC sends an 'IAM', which contains the obtained information of the line number L1;

step 1117: the target MSC prepares a radio resource for the UE-1 according to a standard CS inter-office handover process;

step 1118: the target MSC returns a link establishment response, for instance, the target MSC sends an 'ANM', which contains the information of a line number L2 of a line resource for transmitting CS media data between the target MSC and the eMSC;

step 1119: the eMSC requests the AGW to carry out a mapping operation, for instance, the eMSC sends a 'Map request' message in which the obtained line number L1 or L2 and the transmission address F of the former IMS media connection 2 and the transmission address D of the former IMS media connection 1 are contained;

step 1120: the AGW carries out a mapping operation to connect a new established media connection with the former IMS media connection 2, and sends a map response message to the eMSC via the interface S1016, for instance;

step 1121: the eMSC receives the map response, and sends, via the interface S1008, the former control net element of the PS network a handover response message;

step 1122: after receiving the handover response message, the control net element of the PS network sends, via the interface S1004, the UE-1 a handover command message, and informs the UE-1 of performing handover to a CS domain; and step 1123: after receiving the handover command, the UE-1 adjusts its access mode to a CS domain access mode;

so far, a CS media connection path is established between the UE-1 and the AGW, the CS media connection path consists of a CS media connection between the UE-1 and the CS network, a CS media connection between the CS network and the target MSC, and a CS media connection between the target MSC and the AGW; the AGW connects the new established CS media connection path with the former IMS media connection 2 so that the UE-1 can continue to communicate with the UE-2.

Embodiment of Architecture 4

Figure 12:
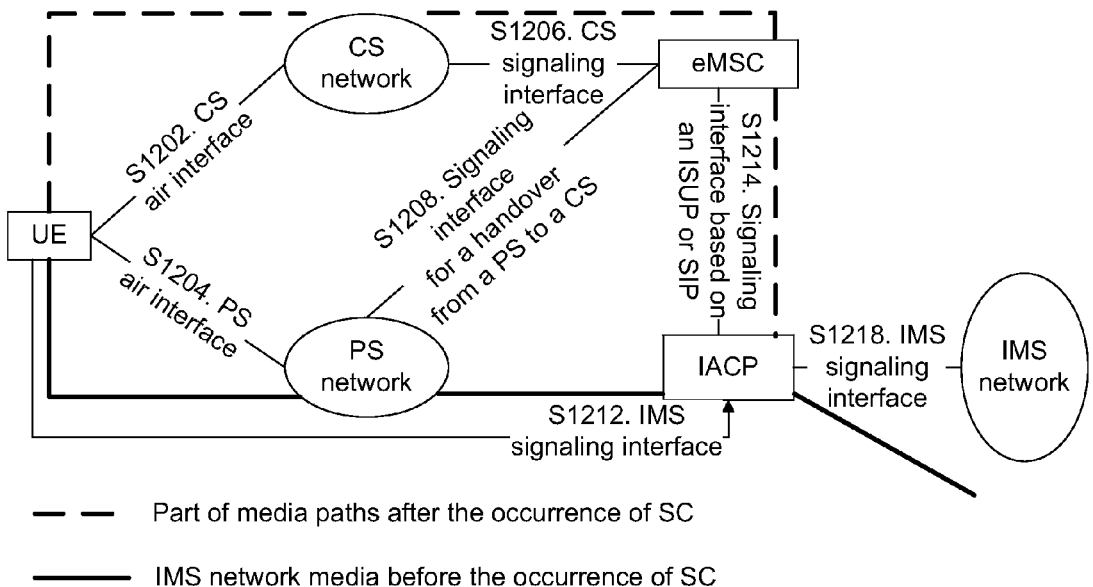
FIG. 12 is a diagram illustrating an architecture in which an ICP and an AGW are integrated based on the architecture 1 according to an embodiment of the present invention.

FIG. 12 is a diagram illustrating an architecture in which an ICP and an AGW are integrated based on the architecture 1 according to an embodiment of the present invention, which describes related parts or net elements of a network for realizing an enhanced SRVCC, and the interfaces or connection relations therebetween, below is specific description:

description on related net elements:

standard SRVCC architecture part: each net element is the same as the corresponding one described in FIG. 4; and IACP: an IMS Access and Control Point function for realizing resource allocation, media path mapping or correlation, the forwarding of IP media data or the forwarding between CS media data and IP media data;

description on related interfaces:

S1202-S1208: the same interfaces as interfaces S402-S408 described in FIG. 4;

S1212: an IMS signaling interface between a UE and the IACP for transmitting IMS signaling between the UE and the P-CSCF via the IACP, such as a Gm interface in accordance with IMS standard;

S1214: a signaling interface between an eMSC and the IACP for transmitting a message during the establishment process of the link between the eMSC and the IACP, such as a standard Nc interface which may be an Nc-SIP interface based on an SIP or an Nc-ISUP interface based on an ISUP; and S1218: a signaling interface between the IACP and an IMS net element for transmitting an IMS protocol message between the UE and the P-CSCF via the IACP, such as a Gm interface in accordance with IMS standard.

The embodiments of the flow under this architecture are almost identical to those described in FIG. 7 and FIG. 8 except that the ICP and the AGW shown in the two figures are integrated into an IACP, thus changing the message flow between the ICP and the AGW to an internal process, so no more repeated description is given here.

Embodiment of Architecture 5

Figure 13:
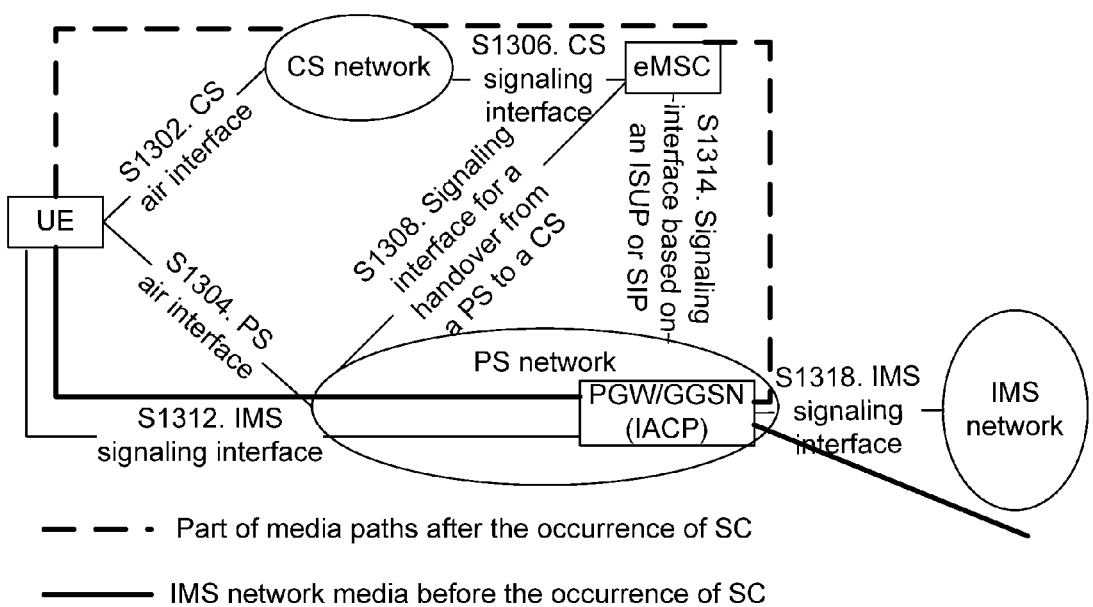
FIG. 13 is a diagram illustrating an architecture in which an ICP, an AGW and a PGW/GGSN are integrated based on the architecture 1 according to an embodiment of the present invention.

FIG. 13 is a diagram illustrating an architecture in which an ICP, an AGW and a PGW/GGSN are integrated based on the architecture 1 according to an embodiment of the present invention, which describes related parts or net elements of a network participating in realizing an enhanced SRVCC, and the interfaces or connection relations therebetween, below is specific description on the net elements and interfaces:

description on related net elements:

standard SRVCC architecture part: each net element is the same as the corresponding one described in FIG. 4;

PGW/GGSN: a net element for the control net element of the PS network connecting with the Internet, belonging to the control net element of the PS network, the net element is called a Packet Data Network GateWay/Global GPRS Support Node, processes the interaction between the control net element of the PS network and an IP network, and is increased with an IMS Access and Control Point (IACP) function to realize resource allocation, media path mapping or correlation, and the forwarding of IP media data or the forwarding between CS media data and IP media data;

description on related interfaces:

S1302-S1308: the same interfaces as interfaces S402-S408 described in FIG. 4;

S1312: an IMS signaling interface between a UE and a PGW/GGSN for transmitting IMS signaling between the UE and a P-CSCF via the PGW/GGSN, such as a Gm interface in accordance with IMS standard;

S1314: a signaling interface between an eMSC and the PGW/GGSN for transmitting a message during the establishment process of the link between the eMSC and the PGW/

GGSN, such as a standard Nc interface which may be an Nc-SIP interface based on an SIP or an Nc-ISUP interface based on an ISUP;

S1318: a signaling interface between the PGW/GGSN and an IMS net element for transmitting an IMS protocol message between the UE and the P-CSCF via the PGW/GGSN, such as a Gm interface in accordance with IMS standard.

The embodiments of the flow under this architecture are almost identical to those described in FIG. 7 and FIG. 8 except that the ICP in the two figures are replaced with the PGW/GGSN that is integrated with the AGW, thus changing the message flow between the PGW/GGSN and the AGW to an internal process, so no more repeated description is given here.

Embodiment of Architecture 6

Figure 14:
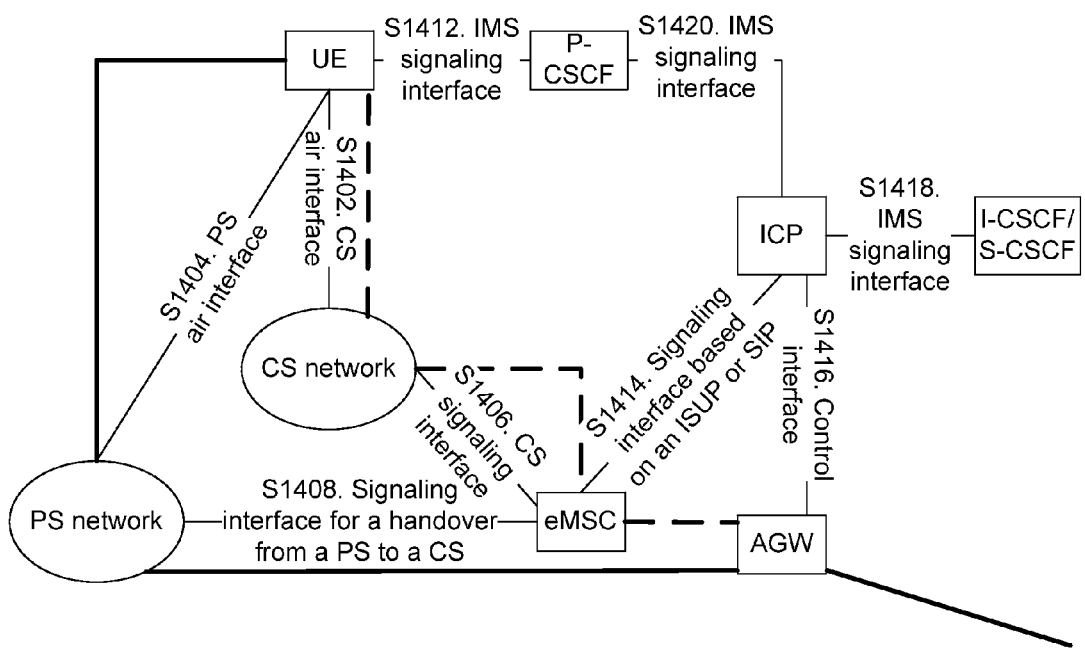
FIG. 14 is a diagram illustrating an architecture 2 of an enhanced SRVCC according to an embodiment of the present invention.

FIG. 14 is a diagram illustrating an architecture 2 of an enhanced SRVCC according to an embodiment of the present invention, which describes related parts or net elements of a network participating in realizing an enhanced SRVCC, and the interfaces or connection relations therebetween, below is specific description on the net elements and interfaces:

description on related net elements:

standard SRVCC architecture part: each net element is the same as the corresponding one described in FIG. 4;

ICP: an IMS Control Point for controlling an AGW to allocate resources, map or correlate media paths; and AGW: an Access Gateway for realizing the forwarding of IP media data or the forwarding between CS media data and IP media data;

description on related interfaces:

S1402-S1408: the same interfaces as interfaces S402-S408 described in FIG. 4;

S1412: an IMS signaling interface between a UE and a P-CSCF for transmitting IMS signaling between the UE and the P-CSCF, such as a Gm interface in accordance with IMS standard;

S1414: a signaling interface between an eMSC and the ICP for transmitting a message during the establishment of the link between the eMSC and the ICP, such as a standard Nc interface which may be an Nc-SIP interface based on an SIP or an Nc-ISUP interface based on an ISUP;

S1416: a signaling interface between the ICP and the AGW for enabling the ICP to control the AGW to allocate resources, map or correlate media paths;

S1418: a signaling interface between the ICP and an I-CSCF or S-CSCF of an IMS for transmitting an IMS protocol message between the P-CSCF and the I-CSCF or S-CSCF via the ICP, such as an Mw interface in accordance with IMS standard; and S1420: a signaling interface between the ICP and the P-CSCF for transmitting an IMS protocol message between the P-CSCF and the I-CSCF or S-CSCF via the ICP, such as an Mw interface in accordance with IMS standard;

Interfaces S1418 and S1420 together form the interface S418 illustrated in FIG. 4.

Embodiment of Flow 4

Figure 15:
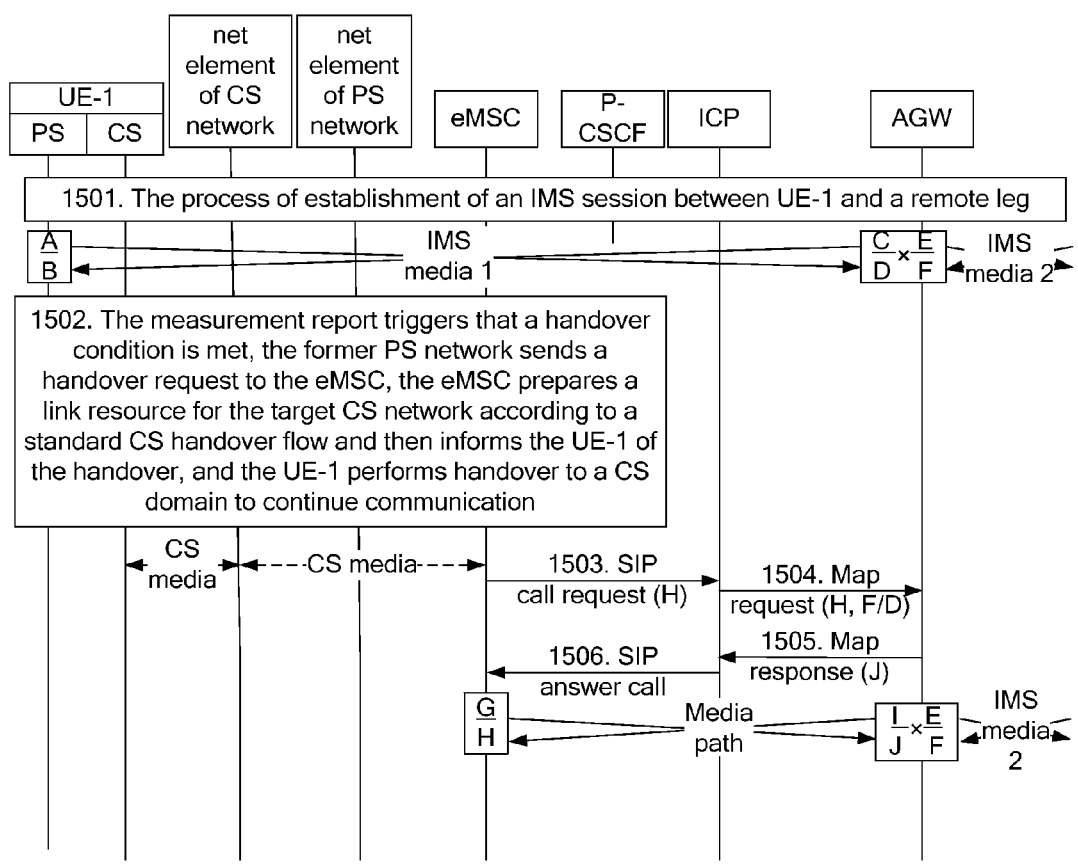
FIG. 15 is a flow chart (Nc-SIP) of an enhanced SRVCC based on the architecture 2 according to an embodiment of the present invention.

FIG. 15 is a flow chart (Nc-SIP) of an enhanced SRVCC based on the architecture 2 according to an embodiment of the present invention, which describes the process of the establishment of an IMS session between a UE-1 and a UE-2, and the consequent establishment of a media connection by the UE-1 using a CS domain under the support of the UE-1 and a network while the continuity of the former session is kept after the UE-1 is subjected to an SRVCC, wherein an Nc-SIP interface is used between an eMSC and an ICP. The process comprises the following steps:

step 1501: a step similar to steps 501-510 described in FIG. 5 but different in that the IMS message transmission between the UE and the ICP passes the net element P-CSCF of a standard IMS; an IMS media connection is established between the UE-1 and the remote leg which includes an IMS media connection 1 between the UE-1 and the AGW and an IMS media connection 2 between the AGW and the remote leg;

step 1502: a step that is the same as steps 511-517 described in FIG. 5;

step 1503: after receiving the handover request message sent by a control net element of a PS network, the eMSC sends a call request to the ICP via the signaling path S1414, in this embodiment, the interface S1414 refers to an Nc-SIP interface, thus, the sent message is an 'INVITE' message of an SIP the call request contains the number information of the UE-1 and the number information of the ICP, wherein the number information of the ICP serves as called information, the number information of the UE-1 serves as calling information, and a transmission address H of the eMSC for receiving media data is contained in the message;

this step may be executed before step 1502 is completed and can be understood in detail by reference to the related description of step 518;

step 1504: the ICP determines that the call request described in step 1503 is the handover request of the session of step 1501, and requests the AGW to carry out a mapping operation, for instance, the ICP sends a 'Map request' message which contains the transmission address H of the eMSC and the transmission address F of the former IMS media connection 2, or the transmission address D of the former IMS media connection 1;

step 1505: the AGW carries out a mapping operation to connect the new established media connection with the former IMS media connection 2, and allocates a new local leg media data receiving port J; for the sake of a simplified description, the transmission address information corresponding to the port J is still represented as J; and after the mapping operation is completed, the AGW sends a map response message to the ICP via the interface S1416, which contains the transmission address J of the AGW for receiving media data;

step 1506: the ICP receives the map response, and sends an answer message of the Nc-SIP, such as a '200 OK' message, to the eMSC via the interface S1414, wherein the message contains the obtained media resource information of the AGW;

so far, a new IMS media path is established between the eMSC and the AGW, the eMSC connects the new established media path with the CS media path, and the AGW connects the new established media path with the IMS media connection 2 so that the UE-1 can continue to communicate with the UE-2.

In an embodiment of the flow under this architecture, in which an Nc-ISUP interface between the eMSC and the ICP is used, the establishment process of an IMS session is identical to the corresponding process described in step 1501 of FIG. 15 and the handover process is identical to that described in FIG. 8, so no more repeated description is given here.

Embodiment of Architecture 7

Figure 16:
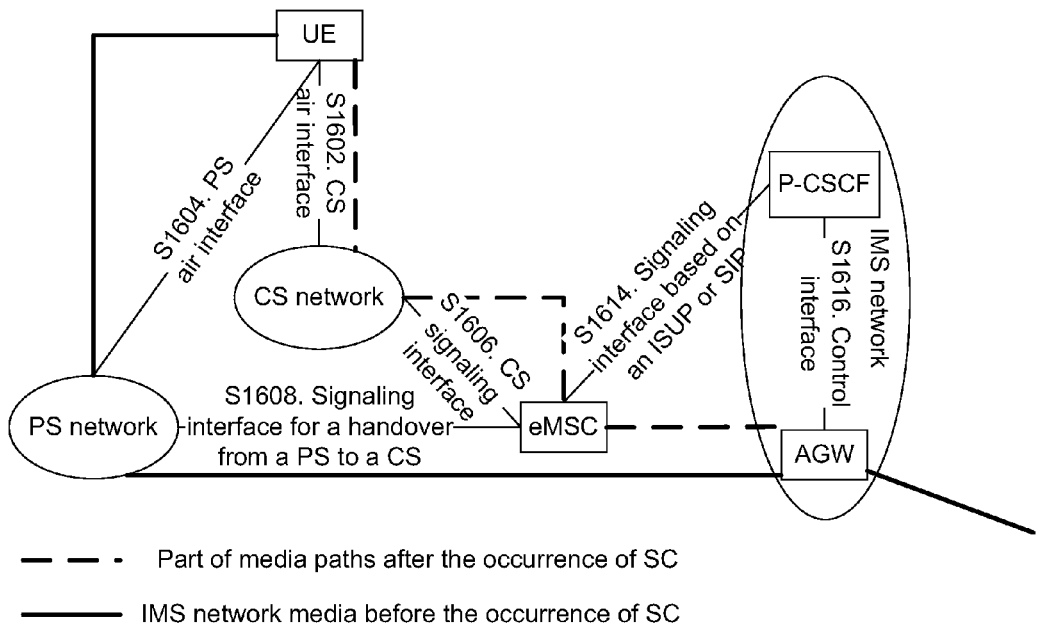
FIG. 16 is a diagram illustrating an architecture in which an ICP and a P-CSCF are integrated based on the architecture 2 according to an embodiment of the present invention.

FIG. 16 is a diagram illustrating an architecture in which an ICP and a P-CSCF are integrated based on the architecture diagram 2 according to an embodiment of the present invention, which describes related parts or net elements of a network participating in realizing an enhanced SRVCC, and the interfaces or connection relations therebetween, below is specific description on the net elements and interfaces:

description on related net elements:

standard SRVCC architecture part: each net element is the same as the corresponding one described in FIG. 4;

P-CSCF: a Proxy-CSCF increased with a signaling path anchoring function on the basis of a standard P-CSCF; and AGW: an Access Gateway for anchoring media paths;

description on related interfaces:

S1602-S1608: the same interfaces as interfaces S402-S408 described in FIG. 4;

as the P-CSCF is an IMS net element, the signaling interface between the UE and the IMS network is a standard IMS interface and is therefore not shown and described;

S1614: a signaling interface between an eMSC and the P-CSCF for transmitting a message during the establishment of the link between the eMSC and the ICP, such as a standard Nc interface which may be an Nc-SIP interface based on an SIP or an Nc-ISUP interface based on an ISUP; and S1616: a signaling interface between the P-CSCF and the AGW for enabling the P-CSCF to control the AGW to allocate resources, map or correlate media paths.

The embodiment of the flow under this architecture is almost identical to that described in FIG. 15 except that the ICP and the P-CSCF shown in FIG. 15 are integrated, so no more repeated description is given here.

Embodiment of Architecture 8

Figure 17:
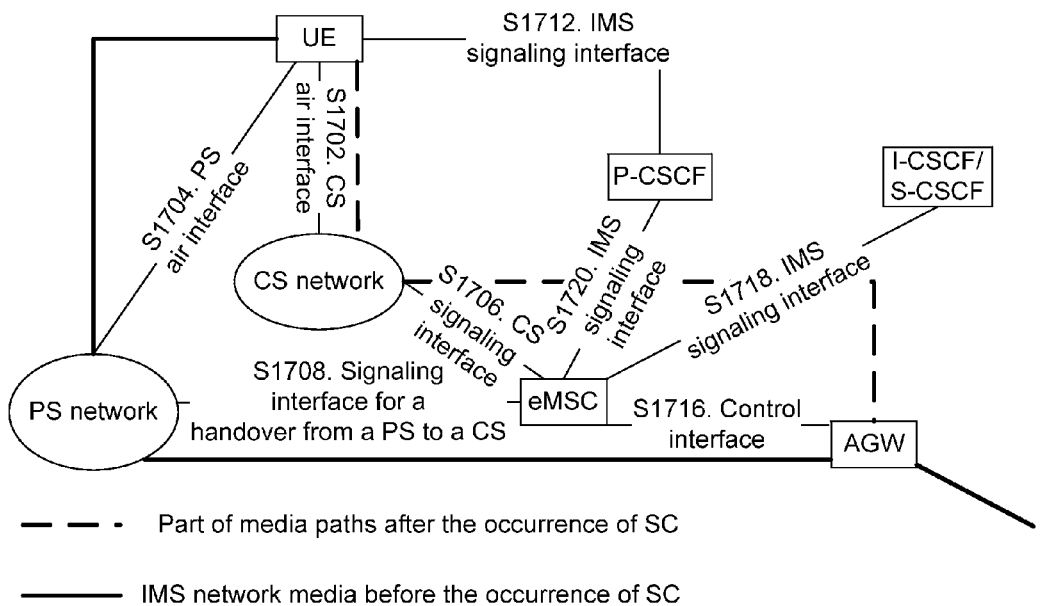
FIG. 17 is a diagram illustrating an architecture in which an ICP and an eMSC are integrated based on the architecture 2 according to an embodiment of the present invention.

FIG. 17 is a diagram illustrating an architecture in which an ICP and an eMSC are integrated based on the architecture 2 according to an embodiment of the present invention, which describes related parts or net elements of a network participating in realizing an enhanced SRVCC, and the interfaces or connection relations therebetween, below is specific description on the net elements and interfaces:

description on related net elements:

standard SRVCC architecture part: net elements, except for the eMSC, are the same as the corresponding net elements described in FIG. 4;

eMSC: an enhanced Mobile Switch Center for processing a handover request sent by a control net element of a PS network, carrying out an inter-domain transfer for a session and correlating a CS handover operation with the inter-domain transfer operation, the eMSC is increased with an IMS Control Point (ICP) function to control an AGW to allocate resources, map or correlate media paths;

AGW: an Access Gateway for realizing the forwarding between CS media data and IP media data;

description on related interfaces:

S1702-1708: the same interfaces as interfaces S402-S408 described in FIG. 4;

S1712: an IMS signaling interface between a UE and a P-CSCF for transmitting IMS signaling between the UE and the P-CSCF, such as a Gm interface in accordance with IMS standard;

S1716: a signaling interface between the eMSC and the AGW for enabling the eMSC to control the AGW to allocate resources, map or correlate media paths;

S1718: a signaling interface between the eMSC and the I-CSCF or S-CSCF of an IMS for transmitting an IMS protocol message between the P-CSCF and the I-CSCF or S-CSCF via an eMSC, such as a standard Mw interface in accordance with IMS standard;

S1720: a signaling interface between the eMSC and the P-CSCF for transmitting an IMS protocol message between the P-CSCF and the I-CSCF or S-CSCF via an eMSC, such as a standard Mw interface in accordance with IMS standard;

Interfaces S1718 and S1720 together form the interface S418 shown in FIG. 4.

Embodiment of Flow 5

Figure 18:
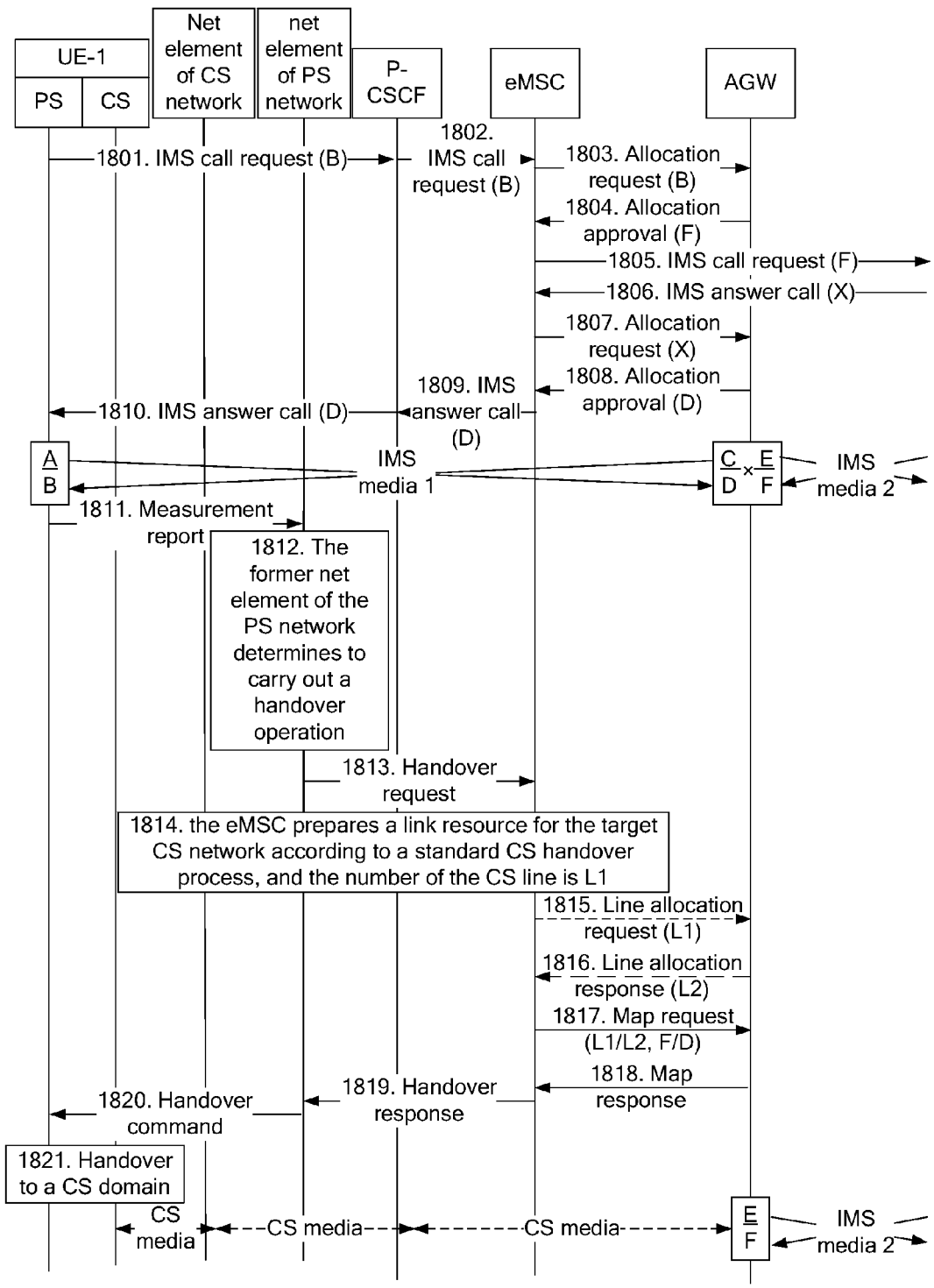
FIG. 18 is a flow chart of an enhanced SRVCC based on FIG. 17 according to an embodiment of the present invention.

FIG. 18 is a flow chart of an enhanced SRVCC based on FIG. 17 according to an embodiment of the present invention, which describes the process of the establishment of an IMS session between a UE-1 and a UE-2, and the consequent establishment of a media connection by the UE-1 using a CS domain under the support of the UE-1 and a network while the continuity of the former session is kept after the UE-1 is subjected to an SRVCC, wherein the target cell to which the UE-1 is handed over is managed by an eMSC, The process comprises the following steps:

step 1801: the UE-1 initiates an IMS call request, for instance, the UE-1 sends an 'INVITE' message, which is born on an IP bearer established by a control net element of a PS network and contains the transmission address information of the UE-1 for receiving media data, wherein the transmission address information is represented as B; the message is routed to a P-CSCF;

step 1802: the P-CSCF forwards the call request to the eMSC;

steps 1803-1808: the same steps as steps 1102-1107 described in FIG. 11;

step 1809: the eMSC replaces the transmission address X of step 1806 with the transmission address D, and then forwards an IMS answer call message; the message passes the P-CSCF;

step 1810: the P-CSCF forwards the IMS answer call message to the UE, wherein the forwarded message is actually born on an IP bearer established by the control net element of the PS network;

so far, an IMS media connection is established between the UE-1 and the remote leg, which includes an IMS media connection 1 between the UE-1 and an AGW and an IMS media connection 2 between the AGW and the remote leg;

below is description on an inter-domain handover of the UE-1:

steps 1811-1814: the same steps as steps 511-514 described in FIG. 5, wherein the prepared CS media resource is identified by a line number L1 on the AGW;

steps 1815-1818: the same steps as steps 804-807 described in FIG. 8;

step 1819: the eMSC receives the map response, and sends the former control net element of the PS network a handover response message via the interface S1708;

step 1820: after receiving the handover response message, the control net element of the PS network sends the UE-1 a handover command message via the interface S1704, and informs the UE-1 of performing handover to a CS domain; and step 1821: after receiving the handover command, the UE-1 adjusts its access mode to a CS domain access mode;

so far, a CS media connection path is established between the UE-1 and the AGW which consists of a CS media connection between the UE-1 and the CS network and a CS media connection between the CS network and the AGW; the AGW connects the new established CS media connection path with the former IMS media connection 2 so that the UE-1 can continue to communicate with the UE-2.

Embodiment of Architecture 9

Figure 19:
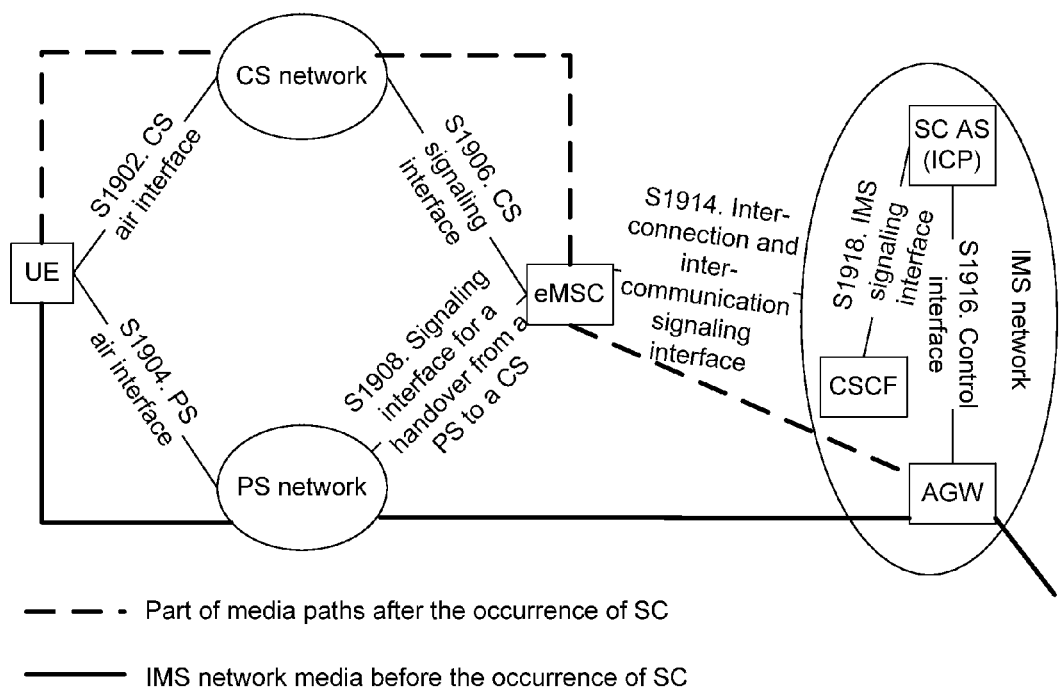
FIG. 19 is a diagram illustrating an architecture in which an ICP and an SC AS are integrated based on the architecture 2 according to an embodiment of the present invention.

FIG. 19 is a diagram illustrating an architecture in which an ICP and an SC AS are integrated based on the architecture 2 according to an embodiment of the present invention, which describes related parts or net elements of a network participating in realizing an enhanced SRVCC, and the interfaces or connection relations therebetween, below is specific description on the net elements and interfaces:
  description on related net elements:
  standard SRVCC architecture part: each net element is the same as the corresponding one described in FIG. 4;
  SC AS: a Service Continuity Application Server function in accordance with IMS standard, which is increased with a function of controlling an AGW to allocate resources, map or correlate media paths; and
  AGW: an Access Gateway for realizing the forwarding of IP media data; description on related interfaces:
  S1902-S1908: the same interfaces as interfaces S402-S408 described in FIG. 4;
  as the SC AS is an IMS net element, the signaling interface between the UE and the IMS network is a standard IMS interface and is therefore not shown and described;
  S1914: the same interface as interface S414 described in FIG. 4;
  S1916: a signaling interface between the SC AS and the AGW for enabling the SC AS to control the AGW to allocate resources, map or correlate media paths; and
  S1918: a signaling interface between the SC AS and the CSCF of the IMS, which is a standard ISC interface in accordance with IMS standard.

Embodiment of Flow 6

Figure 20:
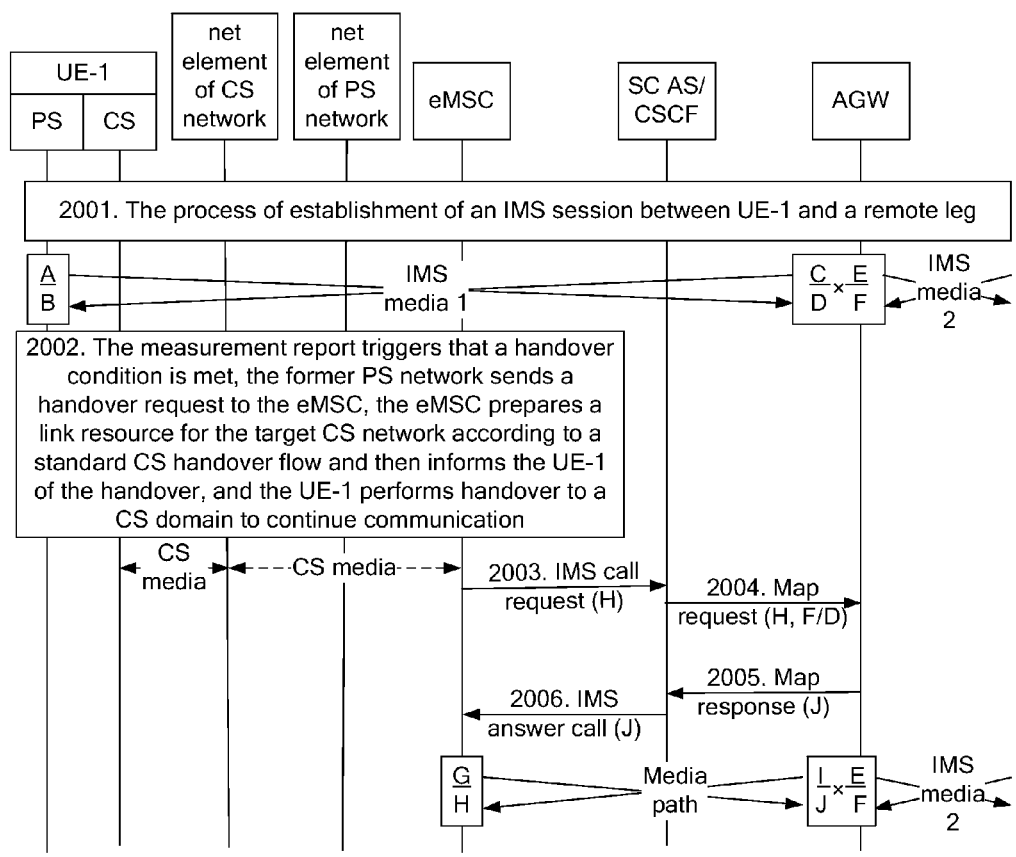
FIG. 20 is a flow chart of an enhanced SRVCC based on FIG. 19 according to an embodiment of the present invention.

FIG. 20 is a flow chart of an enhanced SRVCC based on FIG. 19 according to an embodiment of the present invention, which describes the process of the establishment of an IMS session between a UE-1 and a UE-2, and the consequent establishment of a media connection by the UE-1 using a CS domain under the support of the UE-1 and a network while the continuity of the former session is kept after the UE-1 is subjected to an SRVCC. For the sake of simplified description, an SC AS and a CSCF are drawn as one unit. The process comprises the following steps:
  step 2001: a step similar to steps 501-510 described in FIG. 5 but different in that the IMS message transmission between the UE and the SC AS passes each CSCF net element of a standard IMS in accordance with a standard process; an IMS media connection is established between the UE-1 and the remote leg, wherein the IMS media connection includes an IMS media connection 1 between the UE-1 and the AGW and an IMS media connection 2 between the AGW and the remote leg;
  step 2002: the same step as steps 511-517 described in FIG. 5;
  step 2003: after receiving the handover request message from the control net element of the PS network, the eMSC sends a call request to the SC AS via the signaling path S1914; as in this embodiment the interface S1914 is an I2 interface in accordance with IMS standard, the sent message is an 'INVITE' message of the SIP; the call request contains the number information of the UE-1 and the number information of the SC AS, wherein the number information of the UE-1 serves as calling information and the number information of the SC AS serves as called information, and a transmission address H of the eMSC for receiving media data is contained in this message;
  step 2003 may be executed before step 2002 is completed and can be understood in detail by reference to the related description of step 518;
  step 2004: the SC AS determines that the call request of step 2003 is the handover request of the session of step 2001, and requests the AGW to carry out a mapping operation, for instance, the SC AS sends a 'Map request' message containing the transmission address H of the eMSC and the transmission address F of the former IMS media connection 2, or the transmission address D of the former IMS media connection 1;
  step 2005: the AGW carries out a mapping operation, connects the new established media connection with the former IMS media connection 2, and allocates a new local leg media data receiving port J, for the sake of a simplified description, the transmission address information corresponding to the port J is still represented as J, after the mapping operation is completed, the AGW sends a map response message to the SC AS via the interface S1916, wherein the map response message contains the transmission address J of the AGW for receiving media data; and
  step 2006: the SC AS receives the map response, and sends a answer message to the eMSC via the signaling path S1914, for instance, the SC AS sends a '200 OK' message containing the obtained media resource information of the AGW;
  so far, a new IMS media path is established between the eMSC and the AGW, the eMSC connects the new established media path with the CS media path, and the AGW connects the new established media path with the IMS media connection 2 so that the UE-1 can continue to communicate with the UE-2.
  Under this architecture, if an Nc-SIP interface between the eMSC and the SC AS is used, steps 2003-2006 are the same as steps 703-706 described in FIG. 7; if an Nc-ISUP interface between the eMSC and the SC AS is used, steps 2003-2006 are the same as steps 803-808 described in FIG. 8; if the eMSC and the SC AS are connected via a media gateway, then seen from the SC AS, the flow is unchanged except that the media connection between the eMSC and the AGW consists of a CS media connection between the eMSC and the media gateway and an IMS media connection between the media gateway and the AGW, as the process is completely standardized, no more repeated description is given here.

Although the present invention is described by reference to specific embodiments, it should be understood by those skilled in the art that modifications and variations can be devised without departing from the scope of the present invention and that such modifications and variations belong to the scope of the present invention and the appended claims.

INDUSTRIAL APPLICABILITY

The present invention provides a method for realizing an SRVCC and an SRVCC system, which can effectively shorten the duration of interruption compared with the prior art and greatly improve user experience.

The invention claimed is:

1. A method for realizing a single radio voice call continuity, comprising:
  S1: forwarding, by an IMS Control Point (ICP), an IMS session call request from a user equipment (UE-1) to a remote leg, wherein the IMS session call request contains a transmission address F allocated by an Access Gateway (AGW) which is controlled by the ICP;

S2: forwarding, by the ICP, an IMS session answer call from the remote leg to the UE-1 via the PS network, wherein the IMS session answer call contains a transmission address D allocated by the AGW which is controlled by the ICP;

S3: when a control net element of a Packet Switch (PS) network determines a handover of the UE-1 to a Circuit Switch (CS) network is required, sending, by the control net element of the PS network, a handover request to an enhanced Mobile Switch Center (eMSC) to request a handover of the IMS session to a CS network access mode;

S4: after receiving the handover request from the control net element of the PS network, carrying out, by the eMSC, a CS handover flow and sending, by the eMSC, a handover response to the control net element of the PS network to instruct the UE-1 to change its access mode from a PS access mode to a CS access mode;

S5: after receiving the handover request from the control net element of the PS network, sending, by the eMSC, a handover call request to the ICP; and S6: after receiving the handover call request from the eMSC, controlling, by the ICP, the AGW to correlate a media link established by the handover call request with a remote leg media link of the IMS session.

2. The method according to claim 1, wherein the call request sent by the eMSC is a Session Initiation Protocol (SIP) call request message, which contains a transmission address H which is newly allocated by the eMSC to receive media data in a new established media link;
in the step that the ICP controls the AGW to correlate the media link established by the call request with the remote leg media link of the IMS session: after receiving the SIP call request message, correlating the transmission address H with an external receiving address F of the remote leg media link by the ICP, and sending, via an SIP answer call, the eMSC a transmission address J for receiving media data sent by the eMSC in the new established media link.

3. The method according to claim 2, wherein
in the step that the ICP correlates the media link established by the call request with the remote leg media link of the IMS session:
after receiving the SIP call request message, sending the AGW a map request containing the transmission address H by the ICP; and
correlating the transmission address H with the remote leg media link by the AGW, allocating the transmission address J and sending the transmission address J to the ICP via a map response.

4. The method according to claim 1, wherein
the call request sent by the eMSC is an initial address message of an Integrated Services digital network User Protocol (ISUP), which contains a line number L1 of a line resource in a new established media link for the eMSC end to transmit CS media; and
in the step that the ICP controls the AGW to correlate the media link established by the call request with the remote leg media link of the IMS session: after receiving the initial address message, returning an ANswer Message (ANM) of the ISUP to the eMSC by the ICP, wherein the ANM contains a line number L2 of a line resource in the new established media link for transmitting CS media between the eMSC end and the remote leg.

5. The method according to claim 4, wherein
in the step that the ICP correlates the media link established by the call request with the remote leg media link of the IMS session:
after receiving the initial address message, sending the AGW a map request containing the line number L1 by the ICP; and
after receiving the map request, correlating the line number L1 with the remote leg media link by the AGW, allocating the line number L2, and sending the line number L2 to the ICP via a map response.

6. A single radio voice call continuity system, comprising: an enhanced Mobile Switch Center (eMSC), an IP Multimedia Core Network Subsystem Control Point (ICP), wherein
the ICP is configured to forward an IMS session call request from a user equipment (UE-1) to a remote 1 eq, wherein the IMS session call request contains a transmission address F allocated by an Access Gateway (AGW) which is controlled by the ICP,
the ICP is configured to forward an IMS session answer call from the remote leg to the UE-1 via a Packet Switch (PS) network, wherein the IMS session answer call contains a transmission address D allocated by the AGW which is controlled by the ICP,
the eMSC is configured to receive a handover request from a control net element of the PS network when the control net element of the PS network determines a handover of the UE-1 to a Circuit Switch (CS) network is required, wherein the handover request is used to request a handover of the IMS session to a CS network access mode,
the eMSC is configured to, after receiving the handover request, carry out a CS handover flow and send a handover response to the control net element of the PS network to instruct the UE-1 to change its access mode from a PS access mode to a CS access mode, and send a handover call request to the ICP,
the ICP is configured to, after receiving the handover call request from the eMSC, control the AGW to correlate a media link established by the handover call request with a remote leg media link of the IMS session.

7. The system according to claim 6, wherein
the call request sent by the eMSC is a Session Initiation Protocol (SIP) call request message, which contains a transmission address H which is newly allocated by the eMSC to receive media data in a new established media link;
the ICP is further configured to correlate the transmission address H with an external receiving address F of the remote leg media link after receiving the SIP call request message, and send, via an SIP answer call, the eMSC a transmission address J for receiving media data sent by the eMSC in the new established media link.

8. The system according to claim 7, wherein
the ICP is further configured to send the AGW a map request containing the transmission address H after receiving the SIP call request message; and
the AGW is configured to correlate the transmission address H with the remote leg media link, allocate the transmission address J, and send the transmission address J to the ICP via a map response.

9. The system according to claim 6, wherein
the call request sent by the eMSC is an initial address message of an Integrated Services digital network User Protocol (ISUP), which contains a line number L1 of a line resource in a new established media link for the eMSC end to transmit CS media; and
the ICP is further configured to return an ANswer Message (ANM) of the ISUP to the eMSC after receiving the initial address message, wherein the ANM contains a line number L2 of a line resource in the new established media link for transmitting CS media between the eMSC end and the remote leg.

10. The system according to claim 9, wherein
the ICP is further configured to send the AGW a map request containing the line number L1 after receiving the initial address message; and
the AGW is configured to correlate the line number L1 with the remote leg media link after receiving the map request, allocate the line number L2, and send the line number L2 to the ICP via a map response.

11. A controller supporting a single radio voice call continuity system, comprising a receiving module and a correlating module which are connected with each other, wherein
the receiving module is configured to: forward an IMS session call request from a user equipment (UE-1) to a remote leg, wherein the IMS session call request contains a transmission address F allocated by an Access Gateway (AGW) which is controlled by the ICP; forward an IMS session answer call from the remote leg to the UE-1 via a Packet Switch (PS) network, wherein the IMS session answer call contains a transmission address D allocated by the AGW which is controlled by an IMS Control point (ICP); receive a handover call request from an enhanced Mobile Switch Center (eMSC) after the eMSC receives a handover request from a control net element of the PS network; and inform the correlating module of the received handover call request; and the correlating module is configured to control the AGW to correlate a media link established by the handover call request with a remote 1 eq media link of an IMS session according to the received handover call request.

12. The controller according to claim 11, wherein
the call request sent by the eMSC is a Session Initiation Protocol (SIP) call request message, which contains a transmission address H which is newly allocated by the eMSC to receive media data in a new established media link; and
the correlating module is further configured to correlate the transmission address H with an external receiving address F of the remote leg media link, and send, via an SIP answer call, the eMSC a transmission address J for receiving media data sent by the eMSC in the new established media link.

13. The controller according to claim 11, wherein
the call request sent by the eMSC is an initial address message of an Integrated Services digital network User Protocol (ISUP), which contains a line number L1 of a line resource in a new established media link for the eMSC end to transmit CS media; and
the correlating module is further configured to return an ANswer Message (ANM) of the ISUP to the eMSC, wherein the ANM contains a line number L2 of a line resource in the new established media link for transmitting CS media between the eMSC end and the remote leg.

* * * * *